United States Patent

[11] 3,623,006

[72] Inventors George Balakian
Malvern;
Murray Klug, King of Prussia; Hans K. Forell, Arcola; Leo C. Daluto, West Chester, all of Pa.

[21] Appl. No. 50,734
[22] Filed June 29, 1970
[45] Patented Nov. 23, 1971

[73] Assignee Burroughs Corporation
Detroit, Mich.

[54] QUEUEING DEVICE FOR THE SELECTION OF REQUESTS FOR ACCESS TO A STORAGE MEDIUM

22 Claims, 14 Drawing Figs.

[52] U.S. Cl. .......... 340/172.5
[51] Int. Cl. .......... G06f 7/22
[50] Field of Search .......... 340/172.5

[56] References Cited

UNITED STATES PATENTS

| | | | |
|---|---|---|---|
| 3,493,935 | 2/1970 | Questa .......... | 340/172.5 |
| 3,537,075 | 10/1970 | Anderson et al. .......... | 340/172.5 |
| 3,541,520 | 11/1970 | Mullery et al. .......... | 340/172.5 |

*Primary Examiner*—Raulfe B. Zache
*Assistant Examiner*—Harvey E. Springborn
*Attorney*—Carl Fissell, Jr.

ABSTRACT: In a data processing system which includes secondary storage media, such as magnetic diyks, the present device, descriptively called a disk file optimizer, stores a list or queue of requests for disk access, and using positional information obtained from the several disks in the secondary storage system, selects the most optimum request for execution based on minimum latency time. The device performs a queueing function and may be termed a "queuer."

INVENTORS.
GEORGE BALAKIAN
MURRAY KLUG
HANS K. FORELL
LEO C. DAIUTO
BY
Francis A. Varallo
AGENT

PATENTED NOV 23 1971 3,623,006

SHEET 2 OF 8

SCAN-OUT SIGNAL SEQUENCE

SCAN-IN SIGNAL SEQUENCE

INVENTORS.
GEORGE BALAKIAN
MURRAY KLUG
HANS K. FORELL
LEO C. DAIUTO
BY
Francis A. Varallo
AGENT

INVENTORS.
GEORGE BALAKIAN
MURRAY KLUG
HANS K. FORELL
LEO C. DAIUTO

BY Francis A. Varallo
AGENT

INVENTORS.
GEORGE BALAKIAN
MURRAY KLUG
HANS K. FORELL
LEO C. DAIUTO

BY Francis A. Varallo
AGENT

INVENTORS.
GEORGE BALAKIAN
MURRAY KLUG
HANS K. FORELL
LEO C. DAIUTO
BY
Francis A. Varallo
AGENT INVENTORS.
GEORGE BALAKIAN
MURRAY KLUG
HANS K. FORELL
LEO C. DAIUTO
BY
Francis A. Varallo
AGENT

QUEUEING DEVICE FOR THE SELECTION OF REQUESTS FOR ACCESS TO A STORAGE MEDIUM

BACKGROUND OF THE INVENTION

Modern computer applications require large amounts of on-line data storage. This requires that many programs and data either be resident in the main memory, often comprised of magnetic cores, or quickly transferred from secondary storage. Secondary storage media may take the form of magnetic tape, cards, drums or disks. Since unlimited amounts of core memory are not practical, the systems must be satisfied with a nominal amount of core memory and large amounts of secondary storage, or mass memory. It is an important consideration that the mass storage media be selected and controlled to make it resemble the core memory in speed and efficiency. The device and techniques described and claimed herein serve to bring about such a resemblance.

Consider the case of a data processing system having magnetic disks for secondary storage, but not having the disk file optimizer of the present invention. All requests for disk access would be stored in a software or main-memory queue. All file accesses would be initiated by selecting the next access request from the top of this queue on a first-in, first-out basis. The present invention provides instead, a random selection based upon which access request in its own storage medium is closest to the magnetic disk read/write heads. This not only increases the capacity of all critical data paths to the disk, but also effectively reduces the wait between the time a request is made from the disk and the time the request is fulfilled.

Apart from the basic queueing function just described, and of considerably greater importance, is the fact that the present disk file optimizer offers certain significant advantages as a queueing mechanism, among them being (*a*) the ability to operate with a disk file subsystem which includes different types of disk files, (*b*) the attainment of greater queueing efficiency than hitherto possible and, (*c*) extreme configurational flexibility, including deployment to attain "failsoft" capability.

Each of these advances will now be touched upon briefly although they will become more fully apparent in the succeeding description of the invention.

Queueing mechanisms have been generally limited to operation with one type of disk system. As the state of the art of disk file system design advanced, for example, a bit density or speed of rotation increased, the organization of data on a disk also changed. This has reflected itself in increases in the number of addresses, or alteration of the number of faces per storage unit, the number of zones per face, the number of tracks per zone, or the number of segments per track. All of these alterations rendered the original queueing device inoperative. Compatibility between the queueing device and the altered disk system could only be obtained by means of a drastic redesign of the device. The design of the present disk file optimizer allows realization of compatibility by the simple procedure of removing a printed circuit board from the optimizer card rack and replacing it with an appropriate board which reflects the parameters of the altered disk system. In addition, the present design allows a disk system to include a mixture of up to three distinct types of electronic units and storage units present in the disk file subsystem. This capability is intimately involved with a unique address conversion process which takes place in the present device, and which will be considered in detail hereinafter.

In the matter of greater queueing efficiency, the disk file optimizer provides the following improvements. The desired starting address on the magnetic disk storage unit is normally resolved to a segment of the disk. The present device improves the resolution to a small fraction of a segment. The significance of greater resolving power is that it sharpens the disk file optimizer's decision-making ability, enabling it to accurately select the best access request among several requests, which may address different storage units and which may momentarily represent the same disk latency in terms of segment designations.

The queueing process is fast, continuous and points to the optimum access request at any given time. Instead of defining a range of acceptable latency and selecting the first access request that falls within this range, as often typifies queuer behavior, the disk file optimizer examines all requests stored within its stack memory before selecting an access. Therefore, the selected access request is not merely "acceptable," but is, rather, the one with minimum latency. The optimizer completes at least one scan through its list of access requests before responding to an interrogation by supplying the selected request.

The disk file optimizer's list of access requests resides in a local memory, which for convenience may be modular. This latter arrangement provides for queueing efficiency in the face of a changing system environment. Depending upon the data processing system's activity, the number of access paths to a disk, the size of records transferred, how full the list of access requests is on the average, etc., maximum efficiency can be realized by changing the size of the queuer local memory.

It has been mentioned that the disk file optimizer provides a high degree of configurational flexibility in its interrelationship with a disk file subsystem. The optimizer may be regarded as a separate building block within the data processing system. As such, a computer system including a disk file subsystem, may be organized without the present queueing device because the actual data transfer between the system and the disk files takes place under the sole supervision of disk file control units. Thus in applications where the queueing function is unnecessary, the optimizer may be eliminated. On the other hand, the optimizer may be added to an existing system with minimal, if any, changes to the associated disk file subsystem.

Moreover, the present queuer design permits a configuration which provides a redundance or "failsoft" capability. By pairing disk file optimizers and interconnecting them in an appropriate manner, it is possible under the circumstance where one disk file optimizer becomes inoperative, to have the surviving disk file optimizer operate to assume the function of the unit which has failed, while continuing to service its own associated units.

Finally, at the expense of somewhat degraded queueing efficiency, a single disk file optimizer may be configured to accept the full load normally assigned to a pair of such devices. This arrangement of course, eliminates the highly desirable redundancy feature mentioned hereinbefore, but further illustrates the extreme flexibility of the present device.

SUMMARY OF THE INVENTION

Consider a computer system having a disk file subsystem, the latter comprising at least one electronic unit and one or more disk storage units. The electronic unit which is common to the storage units, provides the control and selection electronics to effect reading from, or writing onto, any of the storage units. The disk file optimizer of the present invention may be considered a hardware adviser to the master control program of the computer system. As such, the disk file optimizer stores file access requests issued by the master control program in a local modular memory. The optimizer selects from these requests the best possible disk address to access whenever the master control program determines that a data path is available and accordingly issues a read or write instruction. The best possible disk address to access is of course, that queued request entry with the least latency time. Hardware logic within the disk file optimizer converts read or write file access requests into corresponding physical shaft positions for each disk storage module on an electronic unit. Each electronic unit is provided with shaft position registers and storage unit connection cables which monitor the actual disk address passing under a storage unit read/write head. These shaft position registers constantly reflect the angular position of disks in a storage module relative to precise clock pulses on a specific clock track. The shaft position registers contain a count of these units of time, that is, clock pulses, beginning with zero through a complete disk revolution for each storage unit. Hardware logic in the disk file optimizer constantly scans the address of each entry in the request queue, comparing this value with the proper electronic unit's address register, which references the segment number of the addressed storage module. The difference between the request item and its properly associated shaft position register or storage unit address, is reflected as a "delta" difference. The disk file optimizer's logic constantly scans all request items, placing the access request with the smallest delta amount, that is, the best possible read or write choice relative to remaining latency until that request item is under a read/write head, in its delta register. When the delta value of an access request in the delta register becomes too small to allow sufficient setup and switching time, should an actual read or write instruction be issued, it is automatically replaced by the disk file optimizer with the next best request. The delta register provides both the best current delta value, and the pointer to the local memory location represented by that value.

It should be noted that the disk file optimizer is a completely passive device in that it simply receives requests for file accesses from the master control program, and continually scans its queue to keep available the best possible choice for access when the master control program requests a read or write to disk operation. A new request passed to the disk file optimizer by the master control program, followed by a request for the best choice read, is considered in determining the best choice. Accordingly, the disk file optimizer always responds to a master control program request with the current best possible choice. Additionally, the disk file optimizer has been designed to omit scans of the requested items whose required electronic units are already involved in a read or write operation. These items are restored to active queue consideration when the input/output operations are completed and the electronic units are again available. These and other features and advantages of the present invention will become apparent as the configuration and mode of operation of the disk file optimizer is described in detail hereinafter.

DESCRIPTION OF THE PREFERRED EMBODIMENT

Figure 1:
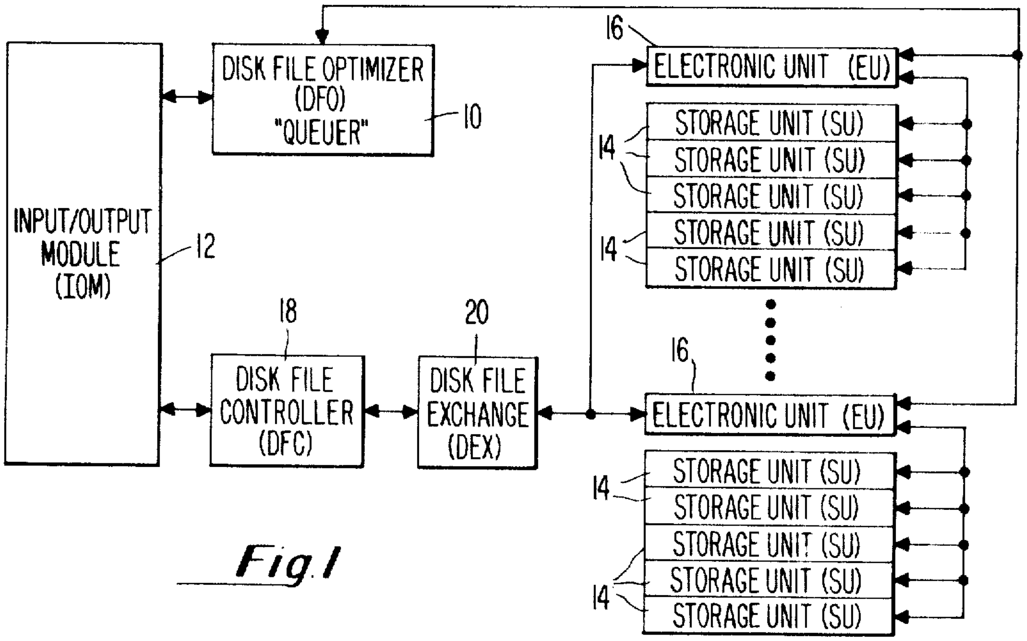
FIG. 1 is a simplified block diagram indicating the relationship of the disk file optimizer (DFO) to other elements in the data processing system.

FIG. 1 illustrates in simplified fashion the manner in which the disk file optimizer (DFO) 10 communicates with other elements in a disk file subsystem (DFS). It has been mentioned that the DFO functions to optimize the transfer of information between an input/output module (IOM) 12 and its associated disk file subsystem, to improve the transfer rate. The DFS which is under the control of the master control program (MCP), consists of storage units (SU's) 14 containing the rotating magnetic disk files and electronic units (EU's) 16 containing the circuits and cabling for switching and selection control of up to a maximum of five SU's per EU. The actual disk data transfer operation is executed by the disk file control unit (DFC) 18 with switching to the selected EU being accomplished by a disk file exchange (DEX) 20.

Before proceeding with the description of the invention it will be helpful to review the characteristics of an actual operative disk file subsystem with which the DFO has successfully operated. It should be emphasized that the description of the DFS and the design parameters mentioned herein are included solely for purposes of example and are not to be construed as limitative of the invention. Other operating environments for the DFO are considered well within the scope of the designer of electronic data processing equipment.

A disk file subsystem may be made up of two basic units, namely an electronic unit and one or more storage units. Up to a maximum of five storage units may be used with a single electronic unit. Each storage unit may consist of four magnetic disks mounted on a common shaft. These disks may be of the "head per track" variety, having one magnetic read/write head per track. Tracks, either singly or in groups, are selected by electronically switching the proper head, or group of heads, to read/write amplifiers. Data is read or written serially, bit by bit, on one track at a time or on several tracks in parallel. The average access time is approximately equal to one-half of a revolution. Each disk face is generally divided into three annular zones, with 50 tracks in each zone. As mentioned previously, the electronic unit provides the control and selection electronics to effect reading from or writing onto any of five storage units. Storage units are addressed by disk face, zone, track and segment number.

The smallest addressable unit of data on a disk is the segment. It consists of a fixed number of characters, depending on the system and its file organization. The outer zones contain more segments per track than the inner zones. This is possible because of the higher amplitude response obtained from heads in the outer zones due to the higher linear velocity of the disk surface. The upper limit of the number of segments is bounded by the frequency response of the magnetic heads.

All tracks include a segment in addition to those listed, which is used for maintenance purposes and is not addressable in the normal operating mode. The starting bit in the first segment of each data track in a storage unit is aligned with its counterparts on other tracks, in all other zones and disk faces within a storage unit. The last bit in the maintenance segment of each track in a zone occurs a predetermined time ahead of the first data segment. This latter time provides a "dead-space," the purpose of which is to allow sufficient time for head switching to another track. The space is uniform across all tracks in corresponding zones within a storage unit—requiring a single bit-timing track for each zone in a storage unit. Similarly, a single segment address track for each zone is provided within a storage unit.

Each storage unit has three segment address tracks among which a single head and read amplifier pair is switched, whenever it is desired to do a segment address compare in the normal mode of operation. One segment address is recorded for each segment in that zone. An average segment address read time is therefore, equal to one-half of a segment transfer time in the respective zone, where most of this time is latency.

The function of the disk file exchange will become apparent from the following. In applications requiring relatively small data bases, each disk file controller may be connected to a single electronic unit which in turn has the capability to exercise control over as many as five storage units. In systems requiring many EU's, this arrangement is wasteful of disk file controllers, since it may not be necessary to provide so many independent and simultaneous paths to the disk file subsystem. In such cases a disk file exchange may be used. Connection between a controller and an electronic unit by way of an exchange, once established, is exclusive. Only one controller may be connected to an electronic unit at any given time. Any available controller may be switched to an available, that is, a nonbusy electronic unit.

It is apparent that the disk file exchanges provide the facility to increase the total number of electronic units in a disk file subsystem to five times the number of disk file controllers. The number of simultaneous accesses to the files is, however, still limited to the number of controllers. The interaction of the disk file controllers, disk file exchanges, electronic units and storage units will be now considered during a typical disk transfer operation.

A descriptor generated by the input/output operating system software and designating one of N electronic units on an exchange, where N is equal to or less than 20, is transferred from an input/output module to a controller. Fields in this descriptor are included for identification of the storage unit (one of five), disk face (one of eight), zone (one of three), track (one of fifty), and the starting segment number (one of $S_n$) of interest. $S_n$ is a function of the disk type, where S is the segment number in the zone specified by "*n*".

If the designated electronic unit is not busy, the exchange will connect it to the disk file controller. Before a transfer can commence however, the proper starting segment must be under the read/write heads of the storage unit specified by the transfer descriptor. The controller determines this by first requesting an "address read" operation from the electronic units specified by the descriptor. The information passed to the electronic unit to facilitate this function includes the "read segment address" signal, the storage unit number and the zone of interest. When this information is received by the electronic unit, it establishes the necessary connection between the selected storage unit and the data/control signal interface at the exchange, and causes the segment address track read head/amplifier pair in the selected storage unit to be connected to the segment address track corresponding to the selected zone. Segment addresses are read and transferred to the controller, which compares the received addresses with the data segments starting address in the active descriptor. Upon comparison, the controller notifies the electronic unit of an imminent data transfer operation, and passes disk face, and track numbers to the electronic unit which proceeds to select the one head in the selected storage unit which is uniquely specified. It should be noted that the zone has been previously specified. Subsequently, as the first bit of the selected segment passes under the read/write heads, the actual data transfers are initiated.

Data is transferred between the storage unit and the electronic unit, or vice versa, bit serially. During a read operation the electronic unit packs the bits received from the storage unit into eight-bit bytes which are transferred to the EU exchange port. The exchange, having previously assigned the EU to one of four controllers on an exchange, routes the data to the proper controller. The controller contains buffer storage for three such bytes. When two bytes have been accumulated, a service is requested of the I/O module. When granted, 16 bits are transferred for each service cycle. For a write operation, data is transferred to the disk on demand from the EU by way of the controller, in the reverse order of processes.

Figure 2:
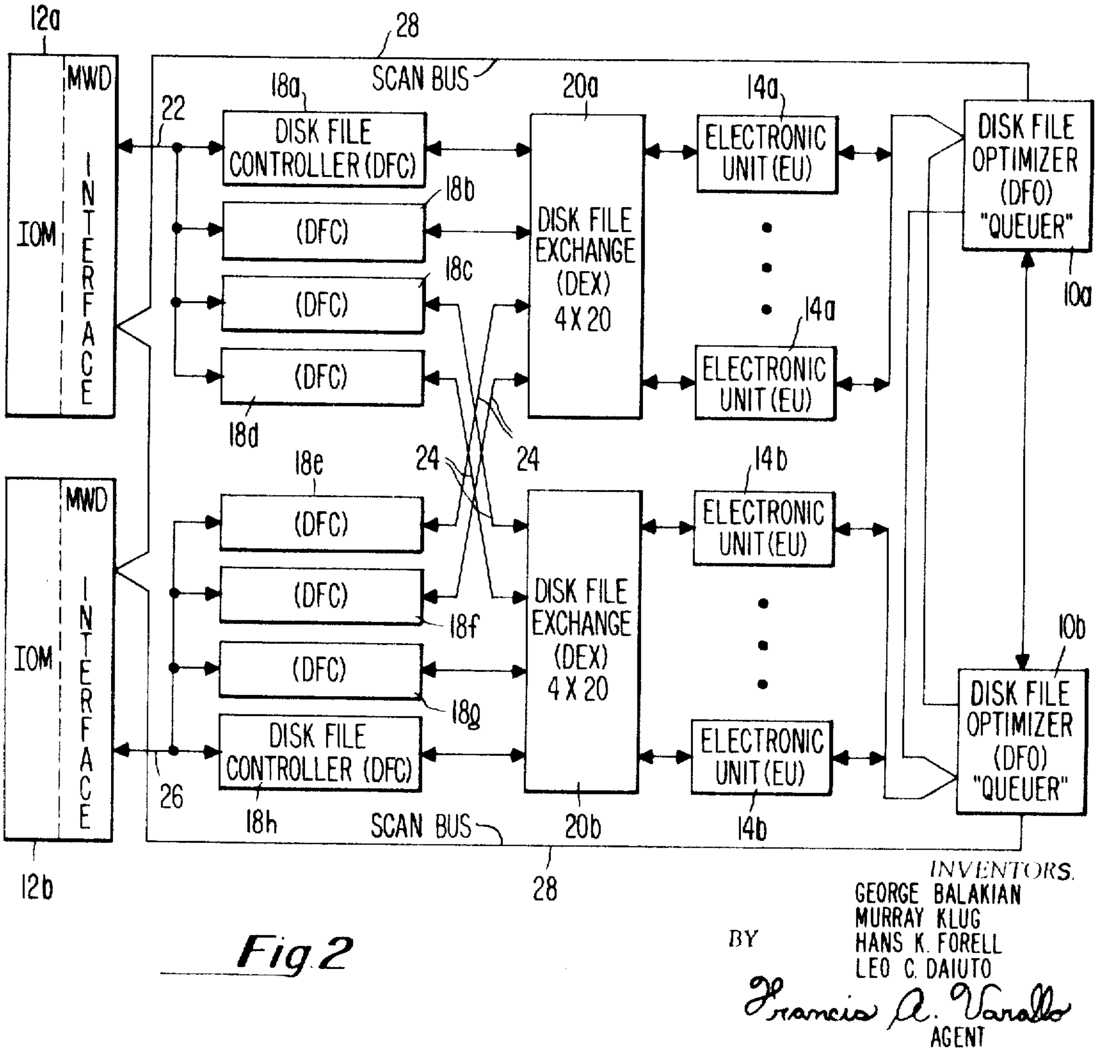
FIG. 2 depicts the interconnections of a pair of disk file optimizers in an actual operative data processing system.

FIG. 2 is an overall block diagram of a representative disk file subsystem utilizing two input/output modules (IOM) 12*a* and 12*b*. Two 4×20 disk file exchanges (DEX) 20*a* and 20*b* and a pair of disk file optimizers (DFO) or queuers 10*a* and 10*b*, one for each exchange, are also depicted. This configuration can be repeated several times depending upon the limit of the bandwidth of the multiple word device (MWD) interfaces of the IOM's. Connections are shown between disk file controllers (DFC) 18*a*–18*d* on the input/output (I/O) peripheral data bus 22 of IOM 12*a* and buses 24 to both disk file exchanges 20*a* and 20*b*. Similarly DFC's 18*e*–18*h* are connected to IOM 12*b* by bus 26 and to the DEX's 20*b* and 20*a* by connectors 24. This is done to provide data paths from either IOM to the electronic units (EU) 14*a* and 14*b* on respective disk file exchanges, which insures access to all files by the surviving IOM in the event of failure of the other IOM.

Each DFO queuer is assigned a primary and a secondary DEX. For example, DFO 10*a* may use DEX 20*a* and 20*b* respectively as primary and secondary. In the normal mode of operation, each DFO will queue the requests from its primary exchange only. The DFO's communicate with the EU's by way of a queuer exchange for the purpose of obtaining present disk position information. The storage units associated with the EU's are not shown in FIG. 2. The queuer exchange function, and its implementation will be discussed in detail hereinafter. Also shown in FIG. 2 is the scan bus 28, over which IOM to DFO communications take place. The functions of the scan bus 28 will likewise be discussed hereinafter. It will suffice at this time to indicate that the scan bus and its scan operations are controlled by the multiple word device interface in the IOM. The scan bus may be controlled by either IOM, either of which can initiate scan operations to any of the DFO's. Conflicts over the control of the bus are resolved within the I/O modules themselves. The scan bus is linked in daisy-chain fashion through each of the DFO's in succession.

Figure 3:
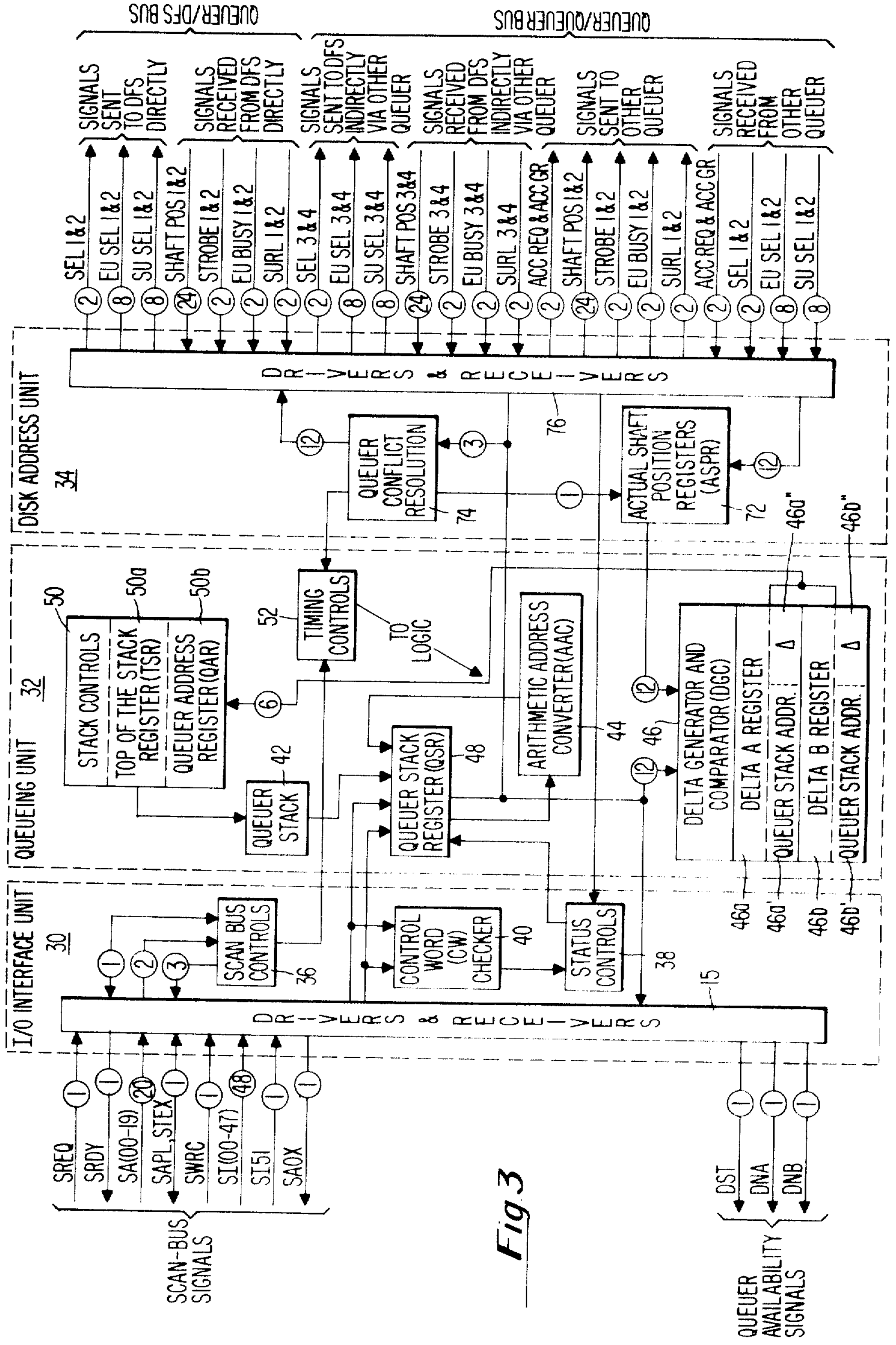
FIG. 3 is a detailed block diagram of the disk file optimizer, including the interface signals.

The block diagram of FIG. 3 illustrates the main sections of the DFO. These sections are the I/O interface unit 30, the queueing unit 32 and the disk address unit 34. The I/O interface unit 30 communicates with the input/output modules (IOM). It accepts control words from the IOM and returns control words and status reports to the IOM. The I/O interface unit includes the drivers and receivers 15, the scan bus controls 36, the control word (CW) checker 40 and the status controls 38.

The lines involved in the DFO/IOM interface constitute the scan bus. The scan bus lines and their associated signals are described hereinafter. The drivers and receivers section 15 provides the DFO with the capability of driving and receiving all the DFO/IOM interface signals.

The scan bus controls 36 supervise the receipt, processing and transmission of the control signals of the DFO/IOM interface.

The control word (CW) checker 40 examines the scan interface lines in order to determine if the scan operation is addressed to the DFO. If the latter is so, the CW checker 40 checks to see if a scan parity error exists.

The status controls 38 store information defining DFO response to the request at the IOM interface and load the status report field of the scan-in word with a code to describe the response. The status controls 38 monitor such conditions as no access to the queuer exchange, storage unit not available, queuer stack parity error, disk address error, queued control word, top-of-the-stack control word, stack empty and control word not available. In each of these circumstances the status controls load the memory link field (the complete memory link address) of the scan-in word with such information, and set the appropriate bit of the status report field.

In an actual operative system the scan bus comprises an 80-line set of cables controlled by the multiple word device interface in the computer system I/O modules. Of the 80 lines which comprise the scan bus, 20 are used as scan address lines, 48 are used for scan data transfer, and the remaining 12 lines are employed for control of the scan operations.

In order to provide two-way data transfers over the scan bus, a scan-out operator is provided to transfer control information out from the MWD interface and a scan-in operator for transfers into the MWD interface. In the case of the DFO, the primary function of the scan-out operator is to transfer disk requests to the DFO. Similarly, the primary function of the scan-in operator is to request transfers of memory links specifying the core memory location of the shortest latency disk transfer request in queue to the MWD interface.

Figure 4:
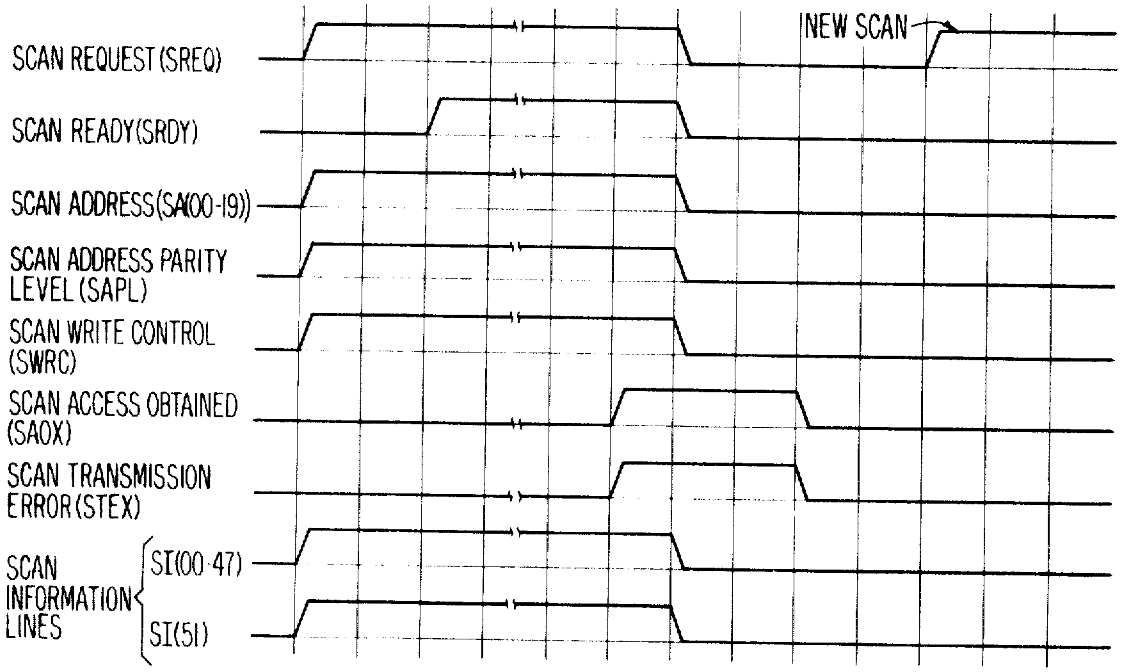
FIG. 4 is a timing diagram of the scan bus scan-out signal sequence.

Those functions of the scan control lines which are pertinent to queuer transfer control are described hereinbelow. Other lines are dedicated to control functions peculiar to other devices. The relative timing of these signals with respect to transitions of the scan address and data lines are shown in FIG. 4 for the scan-out functions, and in FIG. 5 for the scan-in functions.

The scan-in and scan-out signals include:

Scan Request (SREQ): Set by system; broadcasts all devices that a scan operation is in process.

Scan Write/Read Control (SWRC): Set by MWD interface; broadcasts the type of scan operation: SWRC-T for scan-out (or write), SWRC-F for scan-in (or read).

Scan Ready (SRDY): Set by addressed unit; to acknowledge recognition of fact that it is being addressed, and that it is ready to respond to the scan.

Scan Address Lines SA(00–19): Set by MWD interface; scan address lines.

Scan Address Parity Level (SAPL): Set by MWD interface; odd parity on scan address SA(00–19), SREQ and SWRC lines.

Scan Access Obtained (SAOX): Set by addressed unit; when true, indicates that the scan data has been accepted (for a scan-out) or that data has been placed on the scan data lines (for a scan-in operation).

Scan Transmission Error (STEX): Set by the addressed unit; when "true," indicates that the addressed unit has detected a transmission error.

A scan-out operation is performed when the IOM has a control word for the DFO. The control word contains the following information, the desired disk starting address which consists of eight bits defining the desired exchange and the desired EU, and 26 bits defining the desired SU, shaft (if applicable), face, zone, track and segment; function code which together with the scan write control (SWRC) signal is used to define the particular operation to be performed and; the memory link which points to an address in main memory wherein the disk operation is defined, this address being returned to the IOM and identifying the next disk operation to be performed. The IOM initiates the scan-out sequence by raising the SWRC line, and it sends an SREQ signal to the DFO as indicated in FIG. 4. If the DFO memory stack is not full, the DFO will respond by raising its SRDY signal. At this time, the data being sent to the DFO is available on the interface lines, that is, 20 bits are transferred on the SA(00–19) scan address lines, and 48 bits are transferred on the SI)00–47) scan information lines. Two odd parity bits accompany the signals received from the IOM, namely, the SAPL for signals SA(00–19), SREQ, and SWRC; and the SI 51, scan information parity bit, for signals SI(00–47). The DFO indicates receipt of the control word by raising the SAOX signal. If the DFO detects a parity error during transmission of the control word, it also raises the STEX signal.

Figure 5:
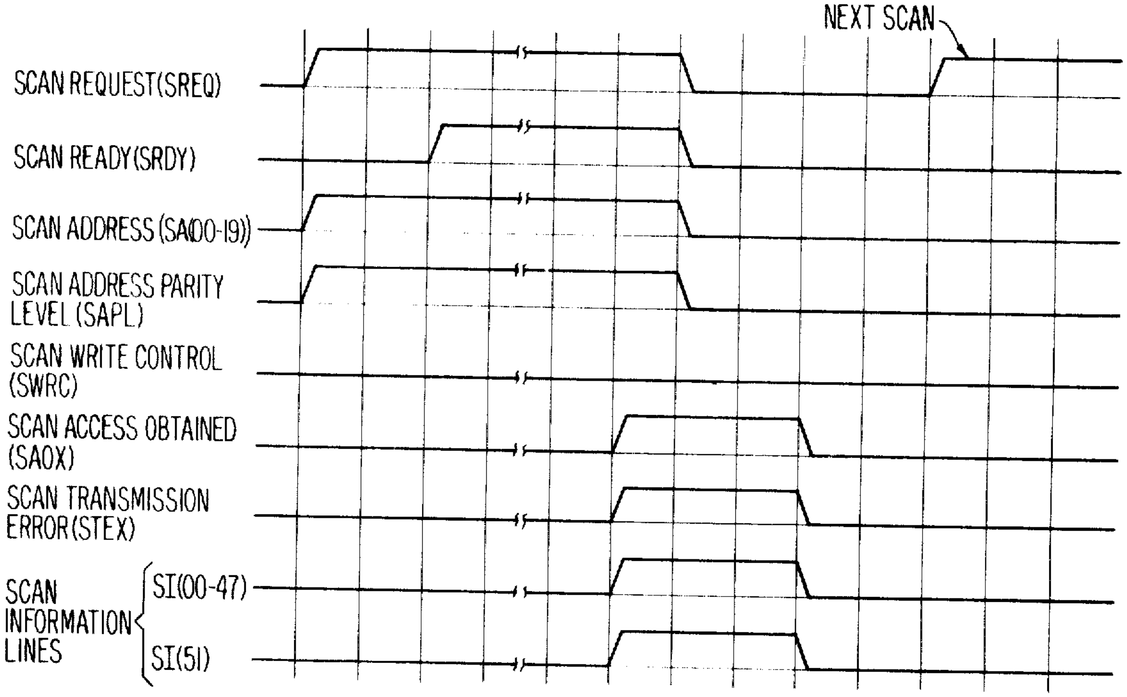
FIG. 5 is a timing diagram of the scan bus scan-in signal sequence.

In a scan-in operation, the IOM requests a control word from the DFO, and initiates the scan-in sequence by keeping the SWRC line low, while sending a SREQ signal to the DFO, as indicated in FIG. 5. The DFO responds by raising its SRDY signal. At this time, control information is transferred to the DFO over the 20 SA(00–19) lines and a parity signal, SAPL is sent to the DFO to maintain odd parity on signals SA(00–19), SREQ and SWRC. The DFO responds by generating a scan-in word, the contents of which are determined by the status controls, together with an odd parity signal for this word, namely SI 51, and raises the SAOX signal to notify the IOM that the control word is available on the interface lines. In addition, if the DFO has detected a parity error during transmission of control information over the 20 SA(00–19) lines, it raises the STEX signal at this time.

The scan bus signals described above are also listed in FIG. 3 as providing inputs to, or receiving outputs from the drivers and receivers 15 of the I/O interface unit. Also depicted are three "queuer availability signals" identified as DST, DNA and DNB. These signals are not part of the scan bus, but are transmitted over separate lines. The function of these signals is as follows:

Do Not Scan-Out (DST): This signal informs the IOM, that the DFO is not available for scan-out operations.

Do Not Scan-In, Exchange A (DNA): This signal informs the IOM that the DFO is not prepared to send a control word referencing disk file exchange "A" at this time.

Do Not Scan-In, Exchange B (DNB): This signal informs the IOM that the DFO is not prepared to send a control word referencing disk file exchange "B" at this time.

The lines connecting the components of the DFO in FIG. 3 indicate paths over which signals may flow. The direction of flow is indicated by the arrowhead or arrowheads on the line. The circled numbers shown on the line provide an indication of the number of conductors which physically connect the components to one another.

The next portion of the DFO queuer to be considered is the queueing unit 32. The major components of the queueing unit are the queuer stack 42, the arithmetic address converter (AAC) 44 and the delta generator and comparator (DGC) 46. The queuer stack 42 comprises a local memory which communicates with the queuer stack register (QSR) 48 and the stack controls 50 which include the top of the stack register (TSR) 50*a* and the queuer address register (QAR) 50*b*. Timing controls 52 are also part of the queueing unit. The function of the timing controls 52 is to provide the overall basic timing coordination for consistent DFO operation and to initiate operation of the various functional units at the proper time. The delta generator and comparator 46 is comprised of a delta A register 46*a* which includes a queuer stack address register 46*a'* and a delta(Δ) register 46*a''* for the "A" exchange; and a delta B register 46*b* with similar registers 46*b'* and 46*b''* for the "B" exchange. The function of these units will be described individually hereinafter. It may be advantageous at this time to describe the configuration for the disk files which expedite the queuer demands for obtaining present disk information as quickly as possible.

In the design of the DFO, it was decided that present disk information would not be obtained via the disk file controller interface because of the half segment transfer time required to access a segment address. Moreover, it was not considered efficient to utilize a controller port on a disk file exchange for this purpose. The solution adopted was to establish a queuer-electronic unit interface. The purpose of the interface is to provide access to certain electronics within the electronic unit associated with the storage units under its control. The interface also includes the necessary connectors required to implement a distributed type queuer exchange, which will be described hereinafter.

Figure 6:
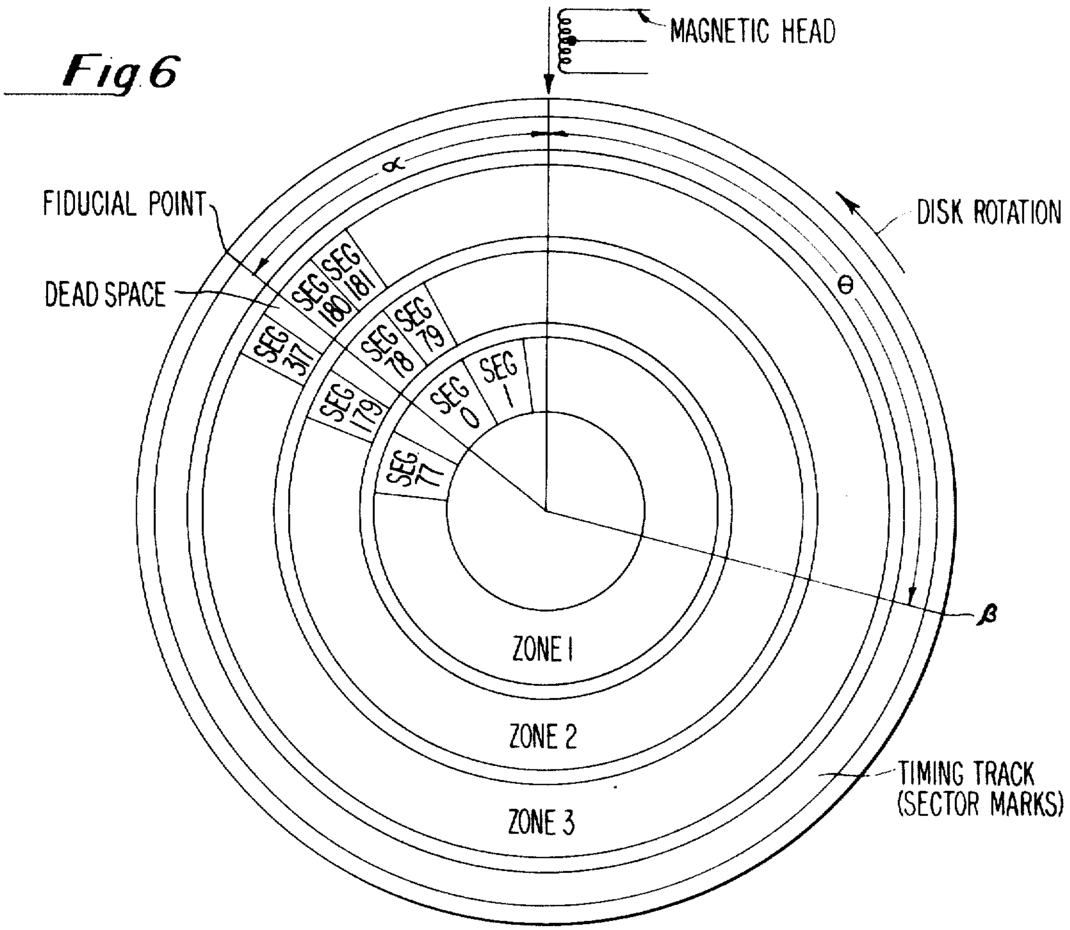
FIG. 6 depicts the organization of a magnetic disk face for use in the disk file subsystem of a computer.

FIG. 6 depicts a typical disk face of a storage unit for use with the DFO of the present invention. The segments in each of the 50 tracks have been indicated, as they appear in the various zones. The fiducial point or reference indicates the beginning of the first segment of all tracks recorded on an SU, and occurs immediately following the dead-space as defined hereinbefore. The position of the read/write heads are also indicated.

If $\alpha$ represents the angle between the fiducial point and the position of the read/write heads, and $\beta$ is the angular position of the segment of interest measured from the fiducial point then ¼, the angular distance of said last-numbered segment from the read/write heads is equal to $(\beta-\alpha)$. The disk latency, Δ in seconds, may then be expressed $\theta T/2\pi$ where T is the disk rotation period in seconds per revolution.

In order to make the disk storage units compatible with the intended DFO operation, a queuer timing track was established on each disk face of the storage unit as indicated in FIG. 6 using one of the existing spare tracks and dedicating one of the spare magnetic heads in each storage unit for this purpose. Sector marks were written on this queuer track and were adapted to be read continuously by the head. A binary counter was also provided in the electronic unit for each storage unit. The sector pulses from each of the queuer tracks are accumulated in their respective counters. At the end of each disk revolution during the dead space, the storage unit sector mark read circuit generates a clear pulse which resets its counter. Selection circuits are provided in each electronic unit by which the DFO can interrogate the count in any of the counters selectively by way of the queuer exchange.

In an actual operating system the sector marks were recorded on the disk faces at 40 microsecond intervals. This interval is considerably less than the segment transfer time of the disks regardless of the zone. At 40 microsecond intervals, the number of sector marks read during a single revolution for the disks may be as high as 2026. Under these circumstances the binary counters in the electronic units were chosen to be 12-bit counters. It should be noted that only those types of disks whose intervals of recorded sector pulses are the same, can be used in a common queuer/disk subsystem configuration. The reason for this is that these sector marks, when accumulated, represent the time equivalent of angular disk position with respect to the first segment on the disk. The accumulated counts, when read by the DFO are used to determine the latency for each request in the queuer stack, and to compare the latencies of all the requests in the stack for the purpose of selecting the one with minimum latency.

The arithmetic address converter (AAC) 44 of the disk file optimizer deals with two address sections, namely an 8-bit field called the electronic unit designate (EUD), and the disk address (DA). The AAC decodes the EUD and from it determines which of a maximum of 40 EU's is being addressed. From this determination, in conjunction with an encoding section which is alterable for field option purposes, it can be established to which group of a maximum of three SU disk types the selected EU belongs. This is necessary so that the proper choice of parameters can be utilized during the conversion of the disk address (DA). The encoding section, or "-map," is alterable by means of jumper wires and can thereby be made to conform with any configuration or distribution of disk types of an installation.

The DA portion of the address received by the DFO from the MCP is a member of an address continuum ranging in value from zero to a number equal to the number of segments accessible by one EU minus one. The manner in which the AAC arithmetically operates upon the DA number, which is a member of the continuum, and extracts from that number the SU, face, zone, track, and segment number in a multiradix conversion phase is described generally by the following example.

Assume that a storage unit (SU) contains four disks (eight faces), each face being divided into three zones, with 50 tracks per zone. Further assume with reference to FIG. 6 that the number of segments in each of the 50 tracks, on a per zone basis, is as follows:

| | |
|---|---|
| Zone 1 (inner)= | 78 segments/track |
| Zone 2 (middle)= | 102 segments/track |
| Zone 3 (outer)= | 138 segments/track |
| Total | 318 segments/triple-track |

There being 50 such triple-tracks per disk face, and eight disk faces per storage element, SU will therefore contain 318×50×8=127,200 segments. The continuum would therefore range from 0 through 127,199.

To determine the selected SU, the largest multiple of 127,200 which is less than or equal to the given address is determined. This multiple determines the specific SU to be selected. The product of the largest multiple times 127,200 is subtracted from the given address to obtain a remainder.

Now there are 127,200/8 or 15,900 segments per disk face. Therefore, in order to determine the disk face of interest, given an address within the bounds of the continuum, it is first necessary to determine the largest multiple of 15,900 which is less than (or equal to) the given address. This multiple determines the disk face. The product of the largest multiple times 15,900 is subtracted from the given address and a remainder is obtained. Next, since there are 318 segments per triple-track (on a disk face) the remainder, resulting from the above subtraction, is used to determine the largest multiple of 318 which is less than or equal to this remainder, which in turn represents a particular (triple) track (of 50). A similar subtraction is performed, to obtain a second remainder, which should be less than 318. If this second remainder is less than or equal to 78, the segment in the inner zone has been identified. If it is between 78 and 179, then 78 is subtracted from the remainder and the segment number obtained is in the middle zone. If the second remainder is greater than 179 (but less than 318), then 180 is subtracted therefrom and the segment number obtained is in the outer zone. In this manner, the segment number is extracted from a member of the continuum.

The DA conversion continues with a segment number-to-time conversion phase and a BCD-to-binary phase. The result of the conversion is the establishment of a desired angular address point as measured from a fiducial point, or point of reference, on the storage disk. This point of reference is at the end of the dead-space. The desired angular point is expressed at the end of the conversion as a count number in binary form. This number represents the number of count pulses—inscribed on a special DFO timing track—which would have to pass a head as counted from aforementioned point of reference. Because the pulse period or repetition rate will be the same for all disk types, independent of segment or zone geometry, such a number is usable in combination with the actual disk position which will also be expressed in count pulse numbers for valid latency comparison of different jobs stored in the queuer stack 42.

Figure 7:
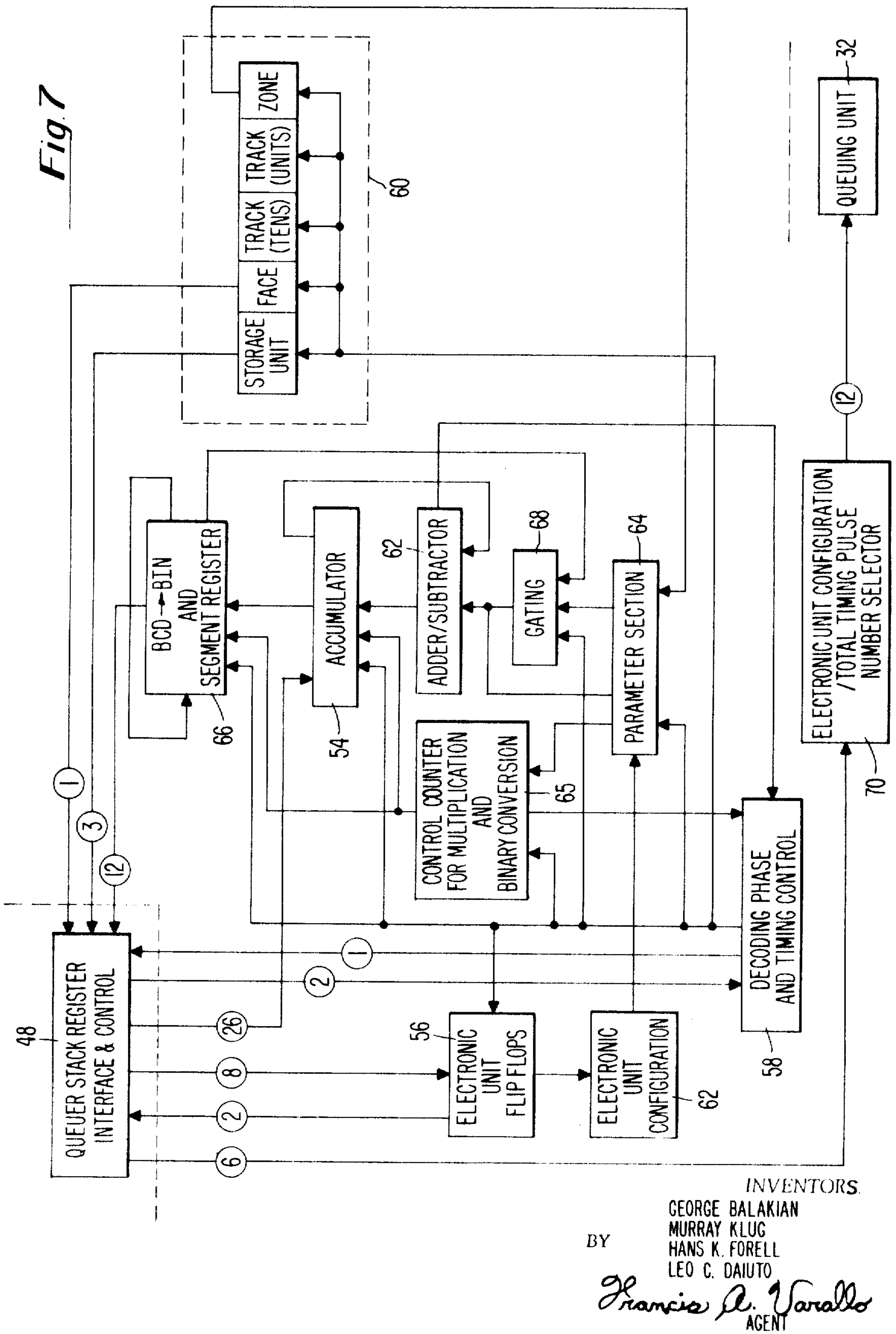
FIG. 7 is a detailed block diagram illustrating the organization of the arithmetic address converter of the DFO.

With reference to FIG. 7, the detailed block diagram of the arithmetic address converter (AAC), the multiradix phase of the disk address (DA) conversion proceeds as follows. The 26 bits comprising the DA made available to the AAC during a scan-out operation are transferred from the interface and control portion of the queuer stack register 48, to the accumulator 54. Concurrent with the loading of the accumulator 54, six electronic unit flip-flops 56 are also loaded, based on information provided by the eight-bit EUD field and establish a six-bit code. The decode phase and timing controls 58 and the output counter/registers 60 are reset at this time prior to the commencement of the multiradix conversion. The information placed in the accumulator is in binary coded decimal (BCD) format and consists of the desired disk starting address (other than the desired exchange number and the desired EU number).

From the disk address (DA) number a subtraction of a number (by complement addition in the adder/subtractor 62) equaling segments per storage unit (SU), as the largest parameter, is attempted and allowed to take place until the remainder is smaller than the parameter. The decoding phase and timing controls unit 58 under the direction of the adder/subtractor 62 selects the appropriate section of the output counter/registers 60, starting with the storage unit (SU) section thereof. A count is kept and stored in the appropriate section, of the subtraction of the associated parameter. The count pulses are supplied by the decoding phase and timing controls 58. When the remainder from the subtraction process is smaller than the parameter being operated upon, the subtraction of the next smaller parameter, e.g., segments per disk face is attempted, followed by track (tens), track (units) and finally, zone. The track specified by the disk address could be determined in connection with the track (units) register alone, but the use of a track (10's) register which indicates whether the track is in the 10's, 20's, 30's, etc. group of tracks simplifies and speeds up the extraction process. The count in the output counter/registers will then reflect the selected SU, face, track, and zone. The number remaining in the accumulator at the end of multiradix conversion will be the actual address number of the desired segment as counted from the fiducial point or disk revolution timing point which serves as a reference, expressed in BCD format.

As indicated hereinbefore the actual subtraction during the multiradix conversion is effected by complement addition of the BCD parameters. Advantage is taken of the addressing system, by which for example, the segments of the first track of the inner zone totaling 78 are numbered from 0 to 77, the segment numbered 78 therefore belonging to the first track of the next zone. The AAC can then at all times anticipate the end-carry in complement addition by always inserting an input carry into the portion of the adder servicing the least significant bit, which for this purpose will be of the full-adder configuration. The end carry of the most significant bit of the adder is then used exclusively to sense whether a successful subtraction can be performed that is, that the result will not be negative. The presence of an end carry delivered to the decoding phase and timing controls 58 allows the subtraction to proceed, while the absence of an end carry signals the decoding phase and timing controls unit 58 to step to the next smaller parameter-complement addition.

Because of the foregoing operation and because of the employment, in the parallel single-rank BCD adder, of high speed carry circuits and binary-to-BCD correction gating, each addition can be accomplished in one clock time and a significant conversion speedup effected.

After the multiradix conversion, a "one" may be added to the contents of the accumulator to account for disk types in which the arrangement of the tracks is such that at the end of the dead space, a maintenance segment preceeds the data segments.

In the second phase of the conversion, the segment number derived during the preceding multiradix phase is converted into the corresponding shaft position, expressed in units of time, taking into account the SU type and the zone of the disk address. This conversion phase serves to provide SU and zone normalization of the segment number extracted from the disk address. This is necessary because a particular segment number in a specified zone of an SU of one type, references a different angular shaft position than the same segment number in the homologous zone of an SU of another type, for example, an SU having different bit density or speed of rotation. Likewise a segment number in one zone, for example, the inner zone of a disk, references a different angular shaft position than the same number in the outer zone of the same disk.

The aforementioned segment number-to-time conversion phase is implemented by a multiplication process. The multiplication process is under the direction of the control counter 65 for multiplication and binary conversion. The eight-bit EUD field is converted by the EU flip-flops 56 into a six-bit code. The latter is applied to the EU configuration section 62 which may be altered to suite particular operating conditions and in which designates a particular disk system being utilized with the disk file optimizer. The parameters for the specified disk system are provided by the parameter section 64. From a table of multiplication factors, a multiplier is chosen, the selection of which depends upon the disk type and the previously derived zone number. The multiplication factor equals the time (TS) it takes the particular segment to pass a fixed point along its circumferential path divided by the time (TP) between the timing pulses on the SU timing track. The timing pulses on the SU timing track are applied to a counter, located in the electronic unit associated with that SU, which monitors the angular displacement of the portion of the disk under the read/write head from a fiducial point. As noted hereinbefore, the fiducial point marks the synchronized beginning of the first segment of all tracks recorded on an SU. Thus, the multiplication factor equals the number of timing pulses which appear during one segment time for the particular segment in question. Stated another way, the multiplication factor (MF) equals the number of timing pulses which can be contained in the arc equivalent to that subscribed by the specified segment. TS, the time during which the segment is under the magnetic read/write head is equal to the following in a particular embodiment:

$$TS(s) = \frac{\text{Disk rotation time} - 100s \text{ (dead space)}}{\text{Segments (in the relevant track)} + 1\text{(maintenance segment)}}$$

The product of the segment number and the multiplication factor (MF) which may be referred to as the converted segment number, equals the number of pulses from the fiducial point to the desired disk access point. The converted segment number derived in the segment number to time conversion phase is thus a measure of absolute shaft position. In an actual system employing the DFO of the present invention, the converted segment number is comprised of 12 bits. It is important to note that it is this normalization process and the concomitant timing pulse generation on the SU timing tracks which provides a uniform basis of comparison of latency associated with access requests to different types of disk system.

In connection with FIG. 7, each multiplication factor is calculated to an accuracy of one hundredth. The multiplication is performed by standard addition and shift cycles. Initially the accumulator 54 is cleared while the segment register 66 holds the address number of the desired segment plus one (for the maintenance segment). The control counter 65 is then preset with the number of the 1/100 weight position of the segment-to-time multiplication factor. The contents of the segment register 66 is then added into the accumulator 54 via gating 68 while the count in control counter 65 is decremented until it equals zero. This procedure continues for the 1/10, unit and tens weights of the segment-to-time multiplication factors.

During the third conversion phase for binary coded decimal-to-binary conversion, the integer content of the accumulator 54 is transferred into the segment register 66. In this phase the converted segment number from the second phase is rounded off by dropping the two BCD digits to the right of the decimal point. The remaining integer, representing in BCD form the pulse count equivalent to the segment's angular location with respect to the end of the dead space on the disk face, is subjected to a BCD-to-Binary conversion in 15 steps (as controlled by the control counter which is initially preset to 15) by end-around shifting the 15 stage segment register via BCD to binary gating.

Residue Modulus 3 error checking is performed during every arithmetic operation, as well as at the end of the BCD-to-Binary conversion.

At the end of the third and last phase of conversion, the shaft position information (time from the fiducial point) comprising 12 bits in binary form together with the SU number of 3 bits and the FA number bit from the SU and FA output counter registers respectively are transferred to the queuer stack register 48. The FA number provides needed information in those applications where the storage unit contains disks on two independent shafts. The EU number (5 bits) and the exchange bit are also loaded into the QSR 48.

The AAC is so arranged that all parameters of up to three disk types are contained on one removable card, so that a card serving a different mixture of up to three disk types can be inserted in the space. These parameters are those necessary during the multiradix and multiplication factor conversion phases. The EU configuration/total timing pulse number selector 70 provides the total pulse counts per circumference for each disk type employed, and provides appropriate information needed for delta calculation by the queueing unit 32 in cases where the delta bridges the disk dead space. The delta under these circumstances is equal to the total pulse count minus the actual number address plus the desired address.

The queuer stack register (QSR) 48 acts as a link to the queuer stack 42. Control words to be written into the stack 42 are loaded first into the QSR 48. Control words stored in the stack may when desired be read into the QSR. The QSR also acts as the link to the scan bus by receiving and transmitting the data interchanged on that bus.

The queueing unit 32 also includes stack controls 50 and the top of the stack register (TSR) 50a and queuer address register (QAR) 50b sections. The stack controls 50 provide overall supervision of writing into or reading from the queuer stack 42. The TSR 50a indicates the extent to which the queuer stack 42 is occupied by registering the topmost position of the stack which is occupied. As a control word is added to the queuer stack 42 the TSR 50a is decremented by one. Whenever a control word is erased from the stack, the TSR is decremented by one. The QAR 50b points to the queuer stack location of current interest.

The loading of the queuer stack 42 will now be considered. As a disk transfer request is received by the AAC, the memory link field is immediately transferred to the topmost position in the queuer stack. The EUD field is used to select a set of parameters corresponding to the particular disk type connected to the electronic unit port of specified exchange. These parameters are used by the AAC to make the proper address conversion (based on the disk model), as described above. At the conclusion of the conversion process, the EU and SU numbers (and possibly a face (F) number) and the converted address are also transferred to the topmost position in the queuer stack. The "stack load" operation is then completed by incrementing the top-of-stack (TSR) register by one, and transferring the new "word" from the topmost stack location to the location specified by the TSR (if the new TSR value corresponds to the topmost stack position, the move is not effected). Note that when the value of the TSR corresponds to the topmost stack location, a stack full condition is noted, and new disk requests are refused by the queuer.

The queuer stack 42 is modularly designed to provide a choice of 32 or 64 words. Each word consists of 48 bits grouped into four fields; and in addition a 49th bit is available for use as a parity check on the other 48. The first field is a six-bit electronic unit number field including five bits to designate one of 20 electronic units (00–19) and a six-bit to identify the exchange. The second field is a three-bit storage unit number derived by the AAC. The third field is the 12-bit time equivalent of disk starting segment angular position, also derived by the AAC. The fourth field is the memory link (ML) field.

It is the function of the delta generator and comparator 46 to determine the latency of each request in the queue and to record and retain the value of the smallest acceptable latency and the stack address of the corresponding request. The DGC 46 is capable of performing this function for requests which address either of two disk file exchanges identified as "A" and "B." Therefore a delta A register 46 comprised of a queuer stack address register 46a' and a Δ register 46a'' is provided for the "A" exchange; and a delta B register 46b comprised of a queuer stack address register 46b' and a Δ register 46b'' is provided for the "B" exchange. The DGC 46 accepts the desired shaft position from QSR 48 and the actual shaft position from the actual shaft position register 72 of the disk address unit 34. The DGC 46 then compares the desired and actual shaft positions and generates a delta (Δ), which represents the difference between the two positions. The DGC then compares this last-mentioned delta with the delta stored in the appropriate delta register 46a or 46b, and stores the smaller of the two deltas in the proper register. The DGC also erases a stored delta when it becomes obsolete. Each delta register is designed to provide a flag or signal level indicating that an acceptable control word is available.

Figure 8:
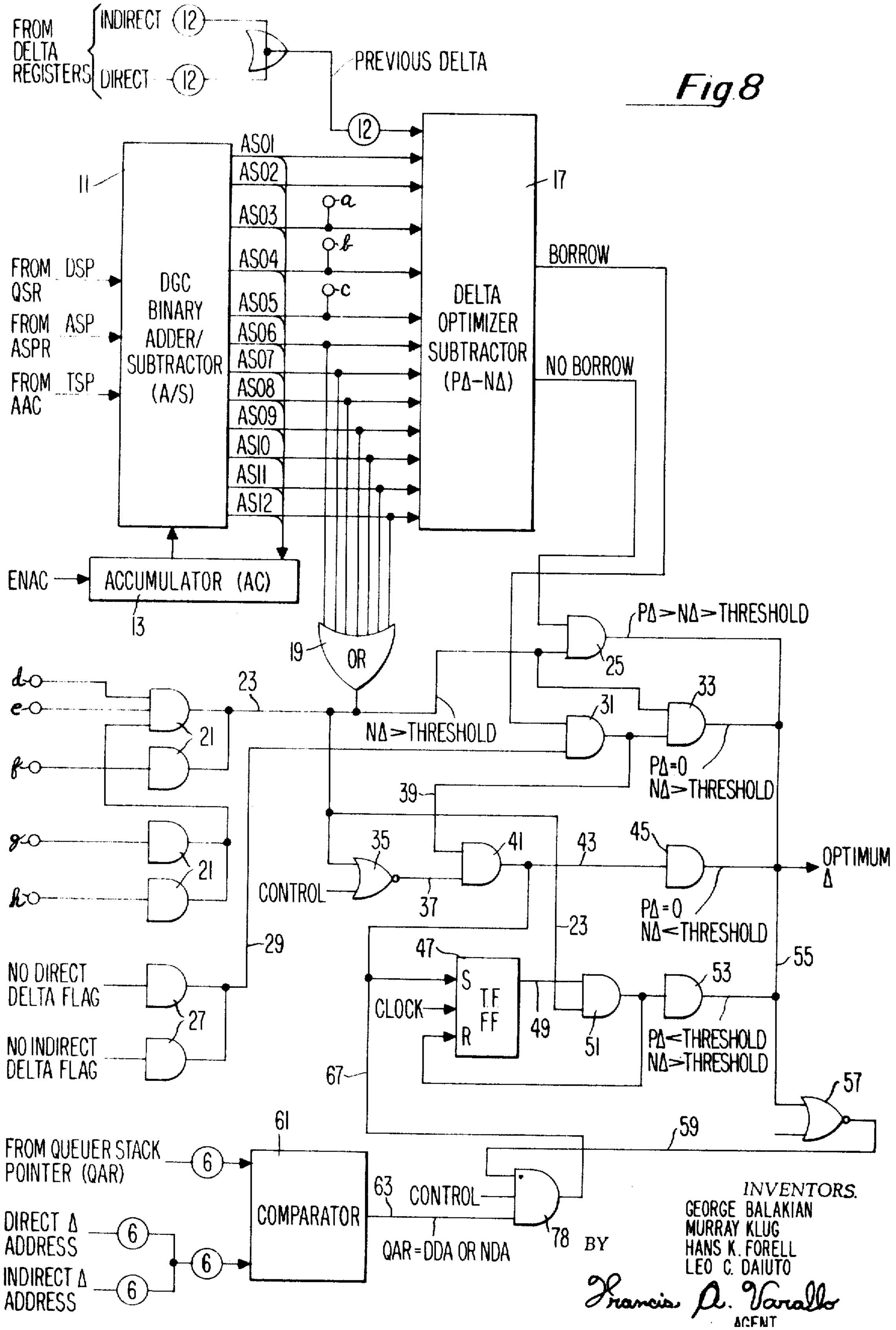
FIG. 8 is a functional logic diagram illustrating the operation of the delta generator and comparator section of the DFO.

The operation of the delta generator and comparator (DGC) 46 is best explained with the aid of the simplified logic diagram of FIG. 8. The operation consists of two parts, namely, the generation of a delta (Δ) based upon the desired shaft position (DSP) of the storage disk relative to its actual shaft position (ASP) and the optimization of the Δ which entails the continuous repetitive evaluation of the delta's of the corresponding control words in the queuer stack register (QSR) 48 of FIG. 3.

Initially the DGC 46 is enabled by applying the 12 bits representing the desired shaft position (DSP) from the QSR, and the 12 bits of the actual shaft position (ASP) from the actual shaft position register (ASPR) to the adder/subtractor (A/S) 11 of the DGC.

At this point it is believed helpful to review the disk timing track organization noted hereinbefore. An additional track is written on the first face of the first disk of each SU. This new track forms a series of timing pulses which ultimately reflect the angular shaft position. The pulses are spaced approximately 40 microseconds apart. The total number of these timing pulses will also vary with the disk type, and is referred to as the tsp for "total shaft pulses." The ASPR provides a continuous count of the timing pulses beginning with the first pulse following the dead-space. The end of the dead space also marks the fiducial or reference point. At the end of each complete revolution of the disk, the actual shaft position counter is reset to zero, and counting of the timing pulses commences anew on the next revolution. Each SU connected to its respective EU has its own counter and is independent of any other SU. The actual shaft position value represents which disk segment addresses are currently available for a disk transfer operation.

Returning to the DGC operation and FIG. 8, the DSP information is read into the minuend gates of the adder/subtractor (A/S) 11 and the ASP information, into the subtractor gates of the A/S 11. The A/S 11 subtracts the actual shaft position (ASP) from the desired shaft position (DSP). If the resultant Δ in time is a positive quantity, that is if DFP>ASP, then the A/S output lines designated AS01 through AS12 represent the calculated delta (Δ). However, if the condition DSP<ASP exists, then the calculation in the A/S proceeds as follows. It should be noted that the last mentioned condition which would result in the generation of a negative Δ, occurs when the Δ spans the zero or reference point of the disk. To take care of this situation, the actual shaft position (ASP) information is gated into the subtractor of the A/S 11, and the total shaft pulse (TSP) information from the AAC parameter section is gated into the minuend of the A/S. The actual shaft position (ASP) is subtracted from the total shaft pulses (TSP) and the remainder is stored in the accumulator 13 which is enabled by the ENAC, enable accumulator, signal.

In the next clock pulse cycle, the desired shaft position (DSP) information is gated into the augend gates of the A/S 11 and the 12 bits stored in the accumulator 13 are gated into the addend gates of the A/S. The addition of the quantities is then accomplished by the A/S. The resultant output from the A/S, namely bits AS01 through AS12 represents the calculated delta, which is the (TSP−ASP)+DSP. If because of some malfunction, a carry should be generated in the A/S during the last-mentioned arithmetic operation, an error exists and the calculated Δ information is not utilized.

The delta optimization is then accomplished as follows. The calculated or new delta (NΔ) appearing on lines AS01–AS12 of the A/S is applied to the optimizer subtractor 17. The 12 bits comprising the previous delta, PΔ, are also applied to the subtractor 17 from either of the appropriate Δ registers. The subtractor then subtracts the new Δ from the previous Δ, that is, PΔ−NΔ. The optimizer subtractor 17 utilizes that portion of a binary subtractor that reflects the propogating borrow. The actual difference in the two values is not utilized and is of no significance. The prime concern is if the new delta, NΔ, on the A/S output lines is smaller or larger in value than the previous delta, PΔ, in either the direct or indirect delta registers. The output lines of the optimizer subtractor 17 designated "no borrow" and "borrow" represent respectively the conditions PΔ>NΔ and PΔ<NΔ. The latter condition is present when the delta register is empty at the time the new delta is generated. It should be understood that the output of the optimizer subtractor 17 could also have been represented as a single line, the level of the signal appearing thereon representing the same conditions as those indicated by the "borrow," "no borrow" lines.

In addition to determining whether the new Δ is smaller or larger than the previous Δ, it is also compared with the "threshold." The threshold is considered the total IOM subsystem response time which is defined as the time starting from the receipt of the control word from the DFO and extending through the disk starting segment address comparison by the disk file controller (DFC). If the new Δ is less than the threshold value, it is not considered a "valid" Δ. In the diagram of FIG. 8, the bit lines AS06–AS12 inclusive are wired to an OR-gate 19, the output of which indicates that the new delta, NΔ, is larger than the predetermined threshold. Thus the presence of any one of the last-mentioned bits (all of which respectively represent the "larger" Δ's) fulfills this condition. Since these bits are permanently wired into OR-gate 19, the corresponding threshold conditions are fixed. Considering smaller Δ values as may be represented by bits AS03, AS04 and AS05, there are provided three terminals designated *a*, *b* and *c* which may be wired in various combinations to terminals *d* through *h* inclusive of the AND-gates 21. The occurrence of predetermined combinations of bits AS03, AS04 and AS05, cause line 23 to rise to a high level indicating that NΔ> threshold. The absence of bits AS06–AS12 inclusive and the failure to achieve the aforementioned combination in the "variable" threshold area, results in the level on line 23 being low, indicating that NΔ< threshold.

Considering the Δ optimization process, if in a first situation, the new Δ is smaller than the old Δ, then the result of the (PΔ–NΔ"no borrow" line from the optimizer subtractor 17 is energized (i.e., is high). If line 23 is also high, indicating that NΔ> threshold, the output of AND gate 25 will reflect the condition that PΔ<NΔ< threshold and a valid optimum Δ is available for storage in the Δ register.

In a second case, if the output from subtractor 17 causes the "borrow" line to be energized (high), then the new Δ is larger than the previous Δ, that is NΔ>PΔ. If in fact this condition exists because PΔ=0, as indicated by the fact that there are no direct or indirect delta flags, that is, that the appropriate Δ register is empty, then gates 27 cause line 29 to be high. The output of gate 31 then reflects the situation, NΔ>PΔ where PΔ=0. If threshold line 23 is high, then gate 33 indicates that PΔ=0 and NΔ> threshold, which means that NΔ is an optimum delta.

In a third situation, where the borrow line is high, NΔ>PΔ and PΔ=0, but the threshold line 23 is low because NΔ< threshold, then the input lines to inverter 35 are both low (control signal is low in this case) and the output on line 37 is high. Since an output is present from gate 31, line 39 is high, and an output is derived from gate 41 on line 43. This last output is passed through gate 45 and indicates an available Δ, having the conditions NΔ< threshold and PΔ=0. Since the NΔ is less than the threshold it is not "valid," but for the moment, it is stored in the appropriate Δ register as an "optimum" delta. To indicate the presence of this invalid Δ in the register, the output from gate 41 sets a flip-flop 47, the latter providing a "threshold flag."

This condition persists until the next Δ is generated. If the new Δ is larger than the threshold, that is, NΔ> threshold, the threshold line 23 and the line 49 at the input to the gate 51 will be high. This last line is high as a result of the set condition of flip-flop 47. The output of gate 51 serves to reset the flip-flop 47 and the signal appearing at the output of gate 53 indicates that whereas the previous was less than the threshold, the new Δ is larger than the threshold (PΔ< threshold; NΔ> threshold). This last NΔ replaces the invalid Δ stored in the Δ register. It should be noted that if the delta occurring after the invalid Δ had also been less than the threshold, the invalid Δ would have been retained in the register, the flip-flop 47 would have remained set, and there would have been no output from gate 53.

If in the processing of any Δ for optimization, the conditions are such that at any given time there is no output from any of the gates 25, 33, 45 and 53, line 55 is low and the output of inverter 57 is high.

For example, consider the special case where a previous optimum delta, PΔ, has been stored in the Δ register and the subsequent delta processing on the same control word, reveals that the new delta is smaller than the threshold. Under these processing conditions, the inverter 57 output on line 59 is high. The address of the Δ being processed is pointed to by the queuer address register (QAR) 50*b* of FIG. 3. This address is applied to comparator 61 where it is compared to the address in the queuer stack address register 46*a*′ or 46*b*′ (FIG. 3) of the DGC, corresponding to PΔ. The comparator 61 generates an output signal on line 63 whenever the two addresses are the same, as in the special case under consideration. Assuming that the control signal which is actuated at predetermined times is also high, the gate 78 generates an output signal on line 67 which is applied to and sets the threshold flag (T.F.) flip-flop 47. Concurrently the new Δ (which is invalid because it is less than the threshold) nevertheless provides an optimum Δ signal at the output of gate 45 and the NΔ replaces the obsolete PΔ in the appropriate Δ register 46*a*″ or 46*b*″ of FIG. 3. In effect, as in the case previously described where PΔ=0 and NΔ< threshold, the next calculated Δ which exceeds the threshold will reset the flip-flop 47, and will replace the invalid Δ(PΔ) in the appropriate register.

Under the conditions where gates 25, 33, 45 and 53 indicate that the new Δ is "optimum," control signals, not shown, direct the NΔ signal on lines AS01–AS12 into either the direct or indirect Δ registers respectively. At the same time, the stack address of the present control word in the queuer address register 50*b* (FIG. 3 that is being optimized is placed in the queuer stack address register associated with the Δ register storing the NΔ. Signal flags are set, indicative of the storage of an optimum Δ in one of the Δ registers. At this time, one of the flip-flops (not shown) which govern the arithmetic processes of A/S 11, supplies a "DGC complete" signal which resets the accumulator 13 and informs the DFO phase and timing logic that the Δ optimization is complete and that the unit is awaiting another control word from the queuer stack.

The function of the disk address unit 34 is to provide the necessary interface between the queuer and the queuer exchange. The disk address unit controls the placement of requests for a disk present position access on the queuer exchange, as specified by the EU and SU numbers, and accepts this information when it is returned from the addressed electronic unit, for transfer to the delta generator 46. It consists of an actual shaft position register (ASPR) 72, conflict resolution circuits 74 to schedule requests to its primary exchange made by the other queuer, and the line drivers and receivers 76 necessary to interface with the queuer exchange. As depicted in FIG. 3 the drivers and receivers 76 have the capability of addressing and receiving signals from up to 20 EU's directly and up to 20 EU's indirectly.

Thus, each DFO queuer has the capability to communicate directly with up to 20 EU's associated with one DEX (by means of two 10 EU buses) and indirectly communicate with up to 20 EU's associated with another DEX via the other queuer. In normal operation, each queuer is restricted to direct communication with its associated 20 EU's but each queuer has the ability to access all 40 EU's (on a pair of disk exchanges), if necessary.

The signals which a queuer sends and receives at the DFS interface are depicted in FIG. 3 and are of the following type:

I. Signals sent directly to the DFS.
II. Signals received directly from the DFS.
III. Signals sent to the DFS, via the other queuer.
IV. Signals received from the DFS, via the other queuer.
V. Control signals sent to other queuer.
VI. Control signals received from other queuer.

I. The signals sent directly to the disk file subsystem (DFS) are as follows:

a. Select 1 (SEL 1)—This signal enables communication between the queuer and the first set of 10 EU's on the DEX normally associated with this queuer. The EU's use this signal to gate out, to the queuer, information from the desired SU.

b. Select 2 (SEL2)—This signal enables communication between the queuer and the second set of 10 EU's on the exchange normally associated with this queuer. The EU's use this signal to gate out to the queuer, information from the desired SU.

c. EU Select 1 (EU SEL 1)—These signals are transmitted over 4 lines. These lines define one of 10 EU's designated by select 1.

d. SU Select 1 (SU SEL 1)—These signals are transmitted over four lines. These lines define one of five SU's in the EU referenced by EU select 1, and one of two shafts, when applicable.

e. EU Select 2 (EU SEL 2)—These signals are transmitted over four lines. These lines define one of 10 EU's designated by select 2.

f. SU Select 2 (SU SEL 2)—These signals are transmitted over four lines. These lines define one of five SU's in the EU referenced by EU select 2, and one of two shafts, when applicable.

II. The signals received directly from disk file subsystem (DFS) are as follows:

a. Shaft Position 1 (SHAFT POS 1)—This is the output of a 12-bit counter containing the time-equivalent of angular position of the shaft of the desired SU referenced by SU Select Signal 1.

b. Shaft Position 2 (SHAFT POS 2)—This is the output of a 12-bit counter containing the time-equivalent of angular position of the shaft of the desired SU referenced by SU Select Signal 2.

c. Strobe 1 (STROBE 1)—This signal indicates existence of valid information on the 12-shaft position 1 lines.

d. Strobe 2 (STROBE 2)—This signal indicates existence of valid information on the 12-shaft position 2 lines.

e. Storage Unit Ready Level 1 (SURL 1)—The storage unit ready level 1 signal indicates that the SU referenced by SU Select 1 has power up, is up to speed, is online, and is otherwise operational.

f. Storage Unit Ready Level 2 (SURL 2)—The storage unit ready level 2 signal indicates that the SU referenced by SU Select 2 has power up, is up to speed, is online, and is otherwise operational.

g. EU Busy 1 (EU BUSY 1)—This signal indicates that the EU referenced by EU Select 1 is busy.

h. EU Busy 2 (EU BUSY 2)—This signal indicates that the EU referenced by EU Select 2 is busy.

III. The signals sent to the disk file subsystem (DFS) via the other queuer of a queuer pair are as follows:

a. Select 3 (SEL 3)—This signal enables communication between the queuer and the first set of 10 EU's on the DEX not normally associated with this queuer, via the other queuer. The EU's use this signal to gate out, to the queuer, information from the desired SU.

b. Select 4 (SEL 4)—This signal enables communication between the queuer and the second set of 10 EU's on the DEX not normally associated with this queuer, via the other queuer. The EU's use this signal to gate out, to the queuer, information from the desired SU.

c. EU Select 3 (EU SEL 3)—These signals are transmitted over four lines. These lines define one of 10 EU's designated by Select 3.

d. SU Select 3 (SU SEL 3)—These signals are transmitted over four lines. These lines define one of five SU's in the EU referenced by Select 3, and one of two shafts, when applicable.

e. EU Select 4 (EU SEL 4)—These signals are transmitted over four lines. These lines define one of 10 EU's designated by Select 4.

f. SU Select 4 (SU SEL 4)—These signals are transmitted over four lines. These lines define one of five SU's in the EU referenced by Select 4, and one of two shafts, when applicable.

IV. The signals received from the disk file subsystem (DFS) via the other queuer are as follows:

a. Shaft Position 3 (SHAFT POS 3)—This is the output of a 12-bit counter containing the time-equivalent of angular position of the shaft of the desired SU referenced by SU Select 3.

b. Shaft Position 4 (SHAFT POS 4)—This is the output of a 12-bit counter containing the time-equivalent of angular position of the shaft of the desired SU referenced by SU Select 4.

c. Strobe 3 (STROBE 3)—This signal indicates existence of valid information on the 12-shaft position three lines.

d. Strobe 4 (STROBE 4)—This signal indicates existence of valid information on the 12-shaft position four lines.

e. Storage Unit Ready Level 3 (SURL 3)—The storage unit ready level 3 signal indicates that the SU referenced by SU Select 3 has power up, is up to speed, is online, and is otherwise operational.

f. Storage Unit Ready Level 4 (SURL 4)—The storage unit ready level 4 signal indicates that the SU referenced by SU Select 4 has power up, is up to speed, is online, and is otherwise operational.

g. EU Busy 3 (EU BUSY 3)—This signal indicates that the EU referenced by EU Select 3 is busy.

h. EU Busy 4 (EU BUSY 4)—This signal indicates that the EU referenced by EU Select 4 is busy.

V. The control signals sent to the other queuer are as follows:

a. Access Request (ACC REQ)—This signal requests access to an EU normally associated with the other queuer.

b. Access Granted (ACC GR)—This signal enables the other queuer to access an EU not normally associated with it, if the bus to the requested EU is not being used.

c. Shaft Position 1 (SHAFT POS 1)—Identical to signals described in II*a*.

d. Shaft Position 2 (SHAFT POS 2)—Identical to signals described in II*b*.

e. Strobe 1 (STROBE 1)—Identical to signals described in II*c*.

f. Strobe 2 (STROBE 2)—Identical to signals described in II*d*.

g. Storage Unit Ready Level 1 (SURL 1)—Identical to signals described in II*e*.

h. Storage Unit Ready Level 2 (SURL 2)—Identical to signals described in II*f*.

i. EU Busy 1 (EU BUSY 1)—Identical to signals described in II*g*.

j. EU Busy 2 (EU BUSY 2)—Identical to signals described in II*h*.

VI. The control signals received from other queuer are as follows:

a. Access Granted (ACC GR)—This signal enables the queuer to access an EU not normally associated with it, if the bus to the requested EU is not being used by the queuer normally associated with it (the other queuer).

b. Access Request (ACC REQ)—This signal, from the other queuer, requests access to an EU not normally associated with it.

c. Select 1 (SEL 1)—This signal indicates a request to raise the signal described in I*a*.

d. Select 2 (SEL 2)—This signal indicates a request to raise the signal described in I*b*.

e. EU Select 1 (EU SEL 1)—This signal indicates a request to raise the signal described in I*c*.

f. SU Select 1 (SU SEL 1)—This signal indicates a request to raise the signal described in I*d*.

g. EU Select 2 (EU SEL 2)—This signal indicates a request to raise the signal described in I*e*.

h. SU Select 2 (SU SEL 2)—This signal indicates a request to raise the signal described in I*f*.

The function of the queuer exchange (QEX) or DFO-EV interface is to provide one of a pair of DFO's or queuers access to as many as 40 electronic units. Each queuer may access one of the electronic units on its primary disk file exchange, independently of the other queuer. If a queuer requests access to an electronic unit on its secondary exchange (not the usual mode of operation) the request is routed through the disk address unit of the queuer whose primary exchange is being addressed and the conflict resolution circuits in the disk address unit 34 grant access to the request as soon as the queuer exchange becomes available. The conflict resolution circuits 74 provide the logic to prevent both DFO's of a pair from accessing the same EU bus simultaneously. The signals required to implement this conflict resolution have been identified hereinbefore in the description of DFS interface signals, sections V. and VI. dealing respectively with "control signals sent to the other queuer" and "control signals received from the other queuer." Normally, this ability to address an electronic unit on a second disk file exchange is provided to allow the surviving queuer of a pair of queue requests addressing electronic units on both disk file exchanges.

The selection of the required electronic unit (EU) by the disk file optimizer (DFO) is accomplished in the following manner. It has been noted hereinbefore in connection with scan-in and scan-out operations that data is transferred on the scan bus over the unidirectional (IOM to DFO) scan address lines and over the bidirectional scan information lines. The format of the scan address lines includes the EUD (electronic unit designate) field whose function is to define the exchange and the EU number associated with the job on the scan bus.

The EUD field is made up of two parts comprising respectively bits 12–15 inclusive and 8–11 inclusive. Bits 12–15 contain binary codes from 0 to 16 which designate the unit the scan bus is activating. In an actual embodiment the DFO (queuer) has four predetermined codes that allow this field to activate it. It should be noted that these codes are variable in accordance with particular operating requirements and may be set by physically orienting jumper wires to effect any code within the 0–16 range. The DFO will ignore any other code in this field other than the four chosen for that particular DFO.

Figure 9:
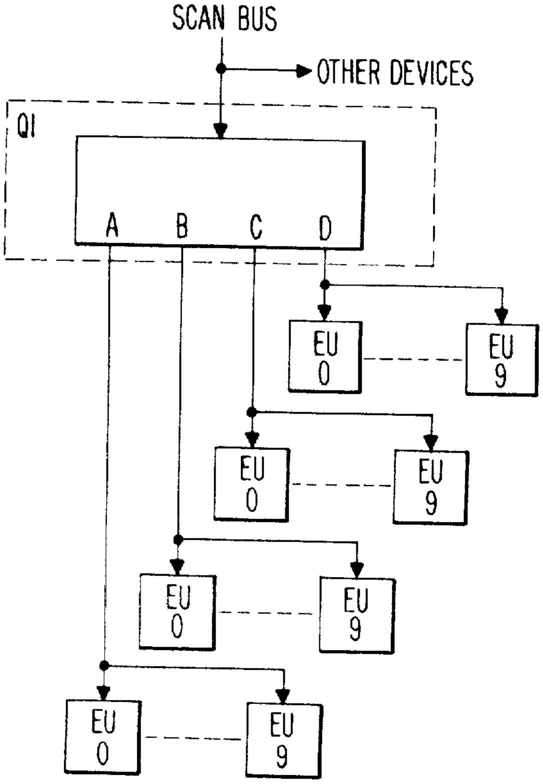
FIG. 9 illustrates in block diagram the role of the electronic unit designate (EUD) field in the selection of a particular electronic unit in a subsystem comprising up to 40 electronic units and a single disk file optimizer.

As mentioned hereinbefore, a single DFO has the capability to interface with up to four sets of 10 EU's, or a total of 40 EU's. Bits 12–15 of the EUD field designate for the DFO what group of EU's, the specific job is for, thereby defining the queuer exchange associated with the job. This arrangement is illustrated in FIG. 9 which shows a single DFO labeled Q1 and 40 EU's. The four codes of the EUD field predetermined for the DFO are A, B, C and D. The presence of each of these codes defines a particular group of 10 EU's.

Bits 8–11 of the other portion of the EUD field contain codes from 0 to 9 which designate one of the 10 EU's comprising the group selected by bits 12–15. It should be noted that if a code greater than 9 appears in bits 8–11, the DFO is designed not to respond regardless of what codes are present in bits 12–15.

Figure 10:
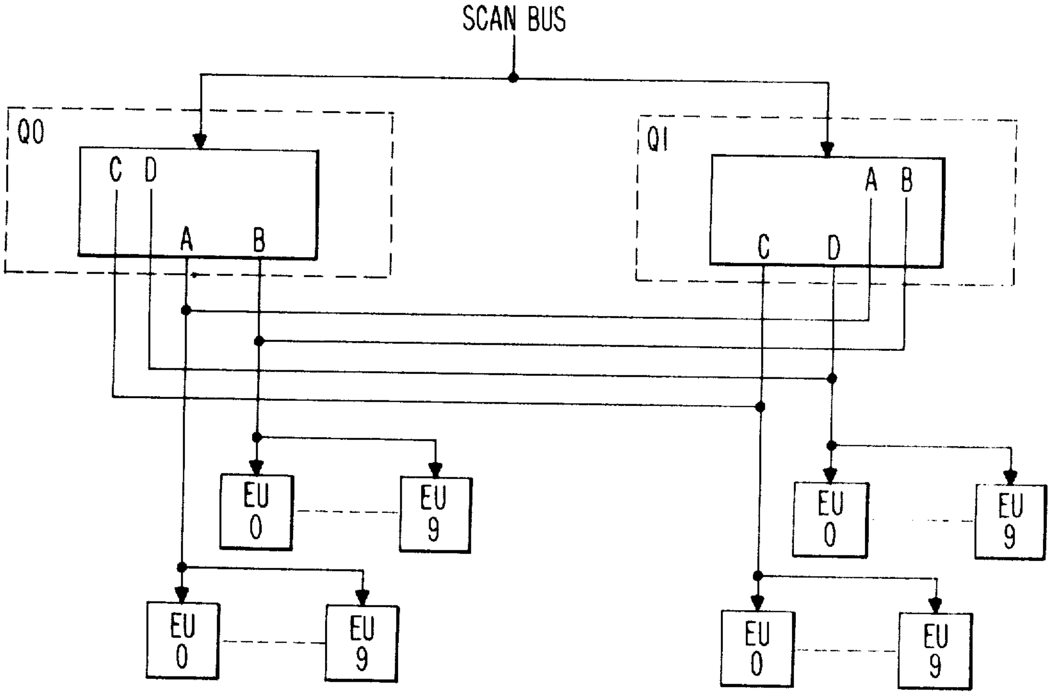
FIG. 10 depicts in block form the use of the EUD field in the selection of an electronic unit in a subsystem comprising up to 40 electronic units and a pair of disk file optimizers.

FIG. 10 illustrates an arrangement of two DFO's designated Q0 and Q1 and 40 EU's. The configuration differs from that mentioned hereinbefore which utilizes conflict resolution circuits to grant access for a first DFO to an electronic unit in the primary exchange of a second DFO. In the illustration of FIG. 10, A, B, C and D are the four predetermined EUD codes for the DFO's. A and B are the direct or primary exchange codes for QO; C. D are the direct or primary exchange codes for Q1. In lieu of the conflict resolution circuits, manual switches are provided on the backplane assembly to "lock out" codes C and C for Q0 and A, B for Q1.

In the event of failure of one of the DFO's, for example Q0, the switch on Q1 must be activated to unlock codes A, B and allow Q1 to respond as in the configuration of FIG. 9. Similarly, if Q1 fails, unlocking codes C, D on Q0 allows the latter DFO to assume the additional load formerly handled by Q1.

Figure 12:
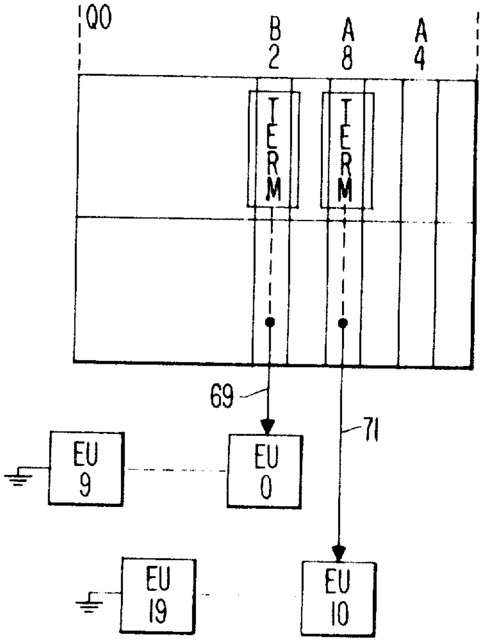
FIG. 12 depicts the DFO-EU interface for a system involving one DFO and up to two sets of EU's, comprising 10 units each.
Figure 11:
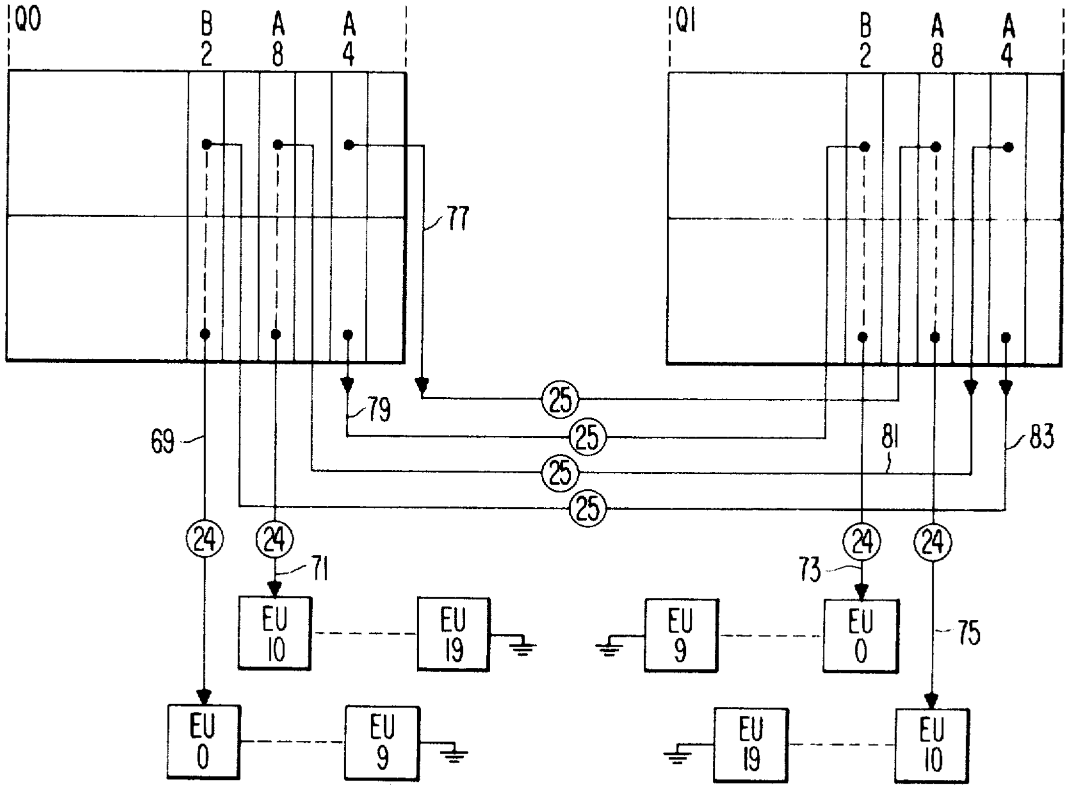
FIG. 11 illustrates the disk file optimizer (DFO) electronic unit (EU) interface or queuer exchange (QEX) including the cable arrangements and interface boards for an EU system involving paired disk file optimizers.
Figure 13:
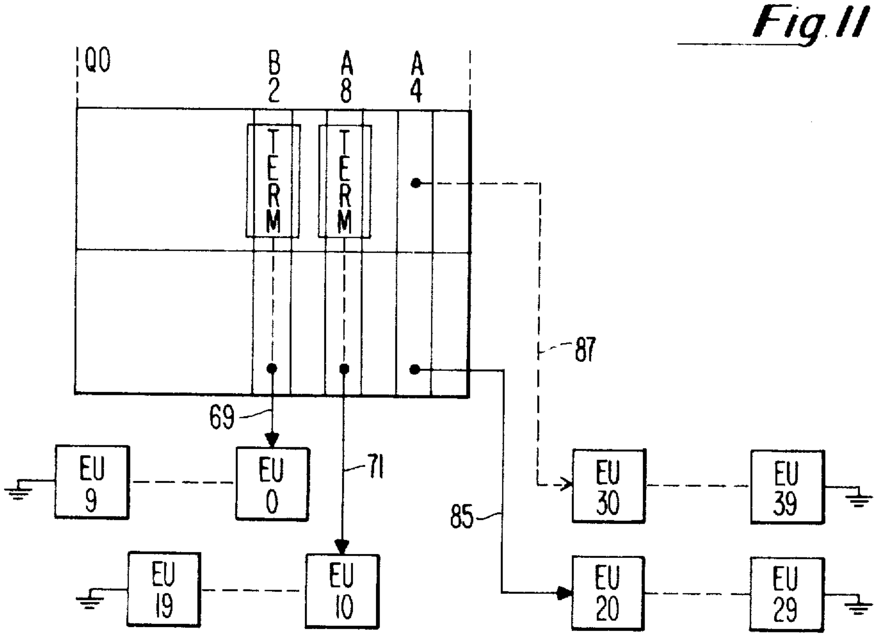
FIG. 13 depicts the DFO-EU interface for a system involving one DFO and up to 40 electronic units.

FIGS. 11–13 inclusive illustrate various configurations of DFO-EU interfaces, including the cabling and interface boards. FIG. 11 depicts a pair of DFO's and 40 EU's, 20 EU's each for the direct (A) and indirect (B) exchanges. The designations B2, A8 and A4 denote particular interface boards and the horizontal line drawn through the center of the boards indicates that the boards are double-ended, with connections being made at the tops and bottoms thereof. The numbers in the circles indicate the conductor count and hence the number of signals which may be carried in parallel by each of the coaxial cables.

Thus in FIG. 11 the disk file optimizer Q0 has 20 EU's on its direct disk exchange (DEX), that is, 20 EU's designated EU0–EU9 connected to the lower terminal of the B2 board by cable or line 69 and the 10 EU's, EU10–EU19, connected to the bottom of the A8 board by line 71. Within each group of EU's the cable, such as 69, is daisy-chained through the group—entering EU0 at its input terminal, and leaving at its output terminal, then entering the EU1 input terminal etc. The last EU in the group is terminated by approximately 100 ohms to ground to eliminate cable noise problems. Similarly, the Q1 optimizer is normally associated with EU0–EU9 inclusive on its direct DEX to which it is connected by line 73 emanating at the bottom of its B2 board, and with EU10–EU19 inclusive on line 75 from the bottom of the A8 interface board. It should be understood that the EU's "normally" associated with Q0, are those "not normally" associated with Q1 and vice versa. Those EU's not normally associated with a DFO are said to be on that DFO's indirect DEX.

The functions of the interface boards depicted in FIGS. 11–13 inclusive are as follows. The A4 board enables communication between Q0 and the EU's on the DEX not normally associated with Q0, by way of Q1. Thus the line 77 from the top of board A4 in Q0 causes up to 25 signals to enter the top of board A8 of Q1 and pass by means of the internal connection (indicated by the dashed line) to the bottom terminal of A8 of Q1 where communication is had with EU10–EU19 inclusive by way of line 75. The line 79 from the bottom of board A4 of Q0 is connected to the top of B2 of Q1 and by the internal connection in board B2, accesses EU0–EU9 by way of line 73. Similar type connections enable Q1 to service EU's on its indirect DEX. Thus line 81 from the top of A4, of Q1 ensures communication with EU10–EU19 inclusive on the A0 direct DEX, by way of board A8 of Q0 and line 71. Line 83 from the bottom of A4, of Q1 accesses EU0–EU9 inclusive on the Q0 direct exchange by way of board B2 of Q0 and line 69. Board A4 provides builtin cable terminations and no terminators are required.

Interface board A8 enables communication between the DFO, either Q0 or Q1 with which it is associated, and the set of EU's identified as EU10–EU19 on its direct exchange. Such communication takes place via line 71 for Q0, and line 75 for Q1. As indicated hereinbefore, the A8 boards also provide connection for the DFO not normally associated with a group to EU's, to communicate with them.

Board B2 enables communication between each of the DFO's Q0 and Q1 and the set of EU's, EU0–EU9 on its direct exchange. This is accomplished respectively over lines 69 and 73. The board also contains an input for the DFO not normally associated with the set of EU's, to communicate with them.

The queuer exchange of FIG. 11 involving paired DRO's provides a "failsoft" capability. When both DFO's are functioning, each DFO operates only with the EU's to which it is directly connected. However, should one of the DFO's of the pair fail, the surviving DFO can operate with both the EU's to which it is directly connected, as well as those to which it is indirectly connected, even if the inoperative DFO's power supply has failed. In this manner, a single DFO may, in an emergency, service the entire group of 40 EU's normally shared by the pair of DFO's. It has been noted previously in connection with the operation of the delta generator and comparator that two delta registers were provided to accommodate operation across two disk file exchanges (DEX). One delta register points to the queuer stack location of the best access request to the direct (A) exchange; the other delta register, to the queuer stack location of the best access request to the indirect (B) exchange. When the master control program (MCP) requests a job for a given exchange, the DFO can respond with the best access request, regardless which DEX is involved.

FIG. 12 illustrates a configuration which may be used with maximum queueing efficiency where the lack of the "failsoft" capability just described can be tolerated. Thus FIG. 12 depicts a single DFO identified as Q0 in which EU0–EU9 are directly connected to the bottom of interface board B2 by cable 69 and EU10–EU19 are directly connected to the bottom of board A8 by line 71. Interface board A4 is not needed. The top connector terminals of boards B2 and A8 are terminated with approximately 100 ohm resistors connected to ground potential. The last EU in each of the groups is also terminated in a similar manner.

The arrangement of FIG. 13, differs from that of FIG. 12 in that Q0 is shown servicing an additional 10 to 20 EU's. Such operation is performed at the expense of queueing efficiency. The efficiency is degraded when operating across two disk file exchanges because, if for example, the queuer stack can accommodate 16 excess requests and these are evenly divided between the 2 exchanges, the direct delta register points to the best job of 8 jobs, whereas, were the DFO servicing EU's connected to its direct exchange only and the queuer stack were full, the job pointed to by the direct delta register would be the best of 16 jobs. In FIG. 13, Q0 performs as though it had been originally paired with Q1 (as in FIG. 11) and Q1 subsequently became inoperative. Of course in FIG. 13, it is assumed that Q1 was never present. Through the use of interface board A4, Q0 has access to the group of EU's, EU20–EU29 by way of cable 85 and if desired to EU30–EU39 by cable 87. EU0–EU9 are serviced directly from board B2 via line 69 and EU10–EU19, directly from board A8 via line 71 as in FIG. 12. Terminations are provided at the tops of boards B2 and A8 and the last EU in each of the groups is terminated.

Figure 14:
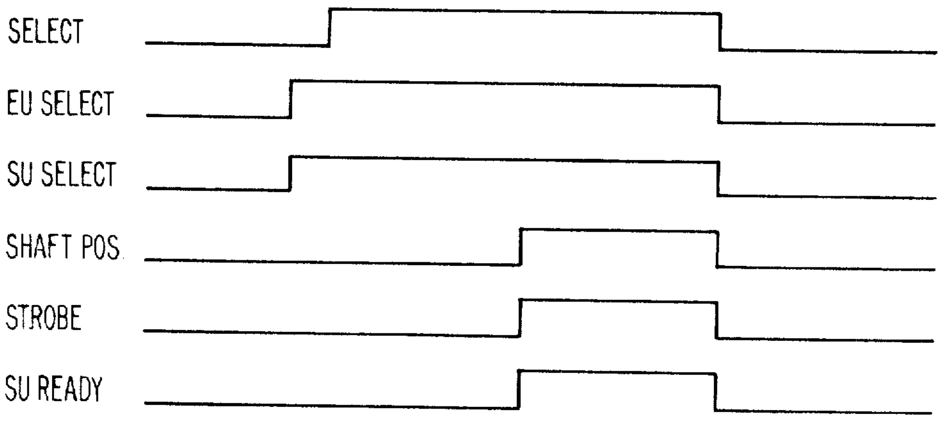
FIG. 14 is a timing diagram illustrating the status of the signals during normal communications between the DFO and the EU's.

The timing diagram of FIG. 14 is included to represent normal communications between the DFO and the EU's. The signals shown in FIG. 14 are those which the DFO sends and receives at the DFS interface. They are given in more specific detail in FIG. 3 and have been described hereinbefore. For convenience, they may be defined briefly as follows. The Select signal enables communication between the DFO and a set of EU's. The EU Select signal defines one of the EU's of the selected set. The SU Select signal defines one of five SU's in the EU selected by the EU Select signal. Shaft Pos. represents the output of a 12-bit counter containing the time-angular position of the shaft of the desired SU referenced by the SU Select signal. The Strobe signal indicates the presence of valid information on the shaft-position lines. Finally, the SU Ready signal signifies that the SU referenced by the SU Select signal is operational. Not shown in FIG. 14 is an EU Busy signal which is present, indicates that the EU referenced by the EU Select signal is busy.

With particular reference to FIG. 3, typical operation of the DFO will now be considered. Assume that several requests have been received and that three of the disk file controllers, DFC's, are in the process of transferring data, and that the memory link to the descriptor selected as the most "optimum" request to be processed by the fourth controller has just been returned to the IOM MWD interface as a result of a scan-in operation. The process of returning the memory link resets the delta register and causes the queuer controls to fetch the stack word in the location pointed to by the top-of-stack (TSR) register 50*a*, to the queuer stack register (QSR) 48, and then decrements the TSR by one count. The contents of the queuer stack address register 46*a*' in the DGC are transferred to the queuer address register (QAR) 50*b* and the word in the QSR is written in that location. This fills the void created in the stack by transferring the optimum request to the IOM, i.e., the word from the uppermost filled position in the stack is used to fill the void.

The process of filling the void leaves the queuer stack address register 46*a*' and the delta register 46*a*'' (in the DSC) and the queuer address register 50*b* in the cleared condition. Moreover a "full stack scan" (FSS) flip-flop (not illustrated) in the queuer controls is reset.

After the stack void is filled, the queueing process begins again by reading the word in the bottom-most location of the stack into the QSR. The EU and SU number fields are transferred to the disk address unit, while the 12-bit "time/angular position" field is passed to the delta generator and comparator 46. It should be noted that reading from the stack is nondestructive. Writing on the other hand always clears first, and then enters the new data into the stack position.

The disk address unit 34 broadcasts the EU and SU numbers over the QEX address select lines. All EU's on the exchange examine the EU number, but only the one addressed responds by enabling its "SU number decoder" to decode the SU number, and thereby select the proper (12-bit) counter for interrogation. The count accumulated in the counter is transferred via the QEX data bus to the disk address unit, which steers it to the DGC 46.

In the DGC the specified starting and actual disk position "-numbers" are compared. If the number received from the SU is less than that obtained from the queuer stack by at least some specified minimum amount, the threshold, taking into account the ambiguity which might be introduced when dead time is bridged, then the difference or "delta" is stored in the delta register 46*a*'', and the stack address of the word tested is placed in the queuer stack address register 46*a*' in the DGC. Thereafter, the queuer address register (QAR) 50*b* is incremented by one, and the next word is tested in a similar manner, and one additional step taken. After the delta for this word is generated, and provided it is greater than the threshold, it is compared with the value already stored in the delta register. The smaller of the two (most imminent) is retained, and its stack address is placed in the queuer stack address register 46*a*' in the DGC.

This process continues until the topmost word in the stack has been tested. This is determined by comparing the contents of QAR 50*b* with those of TSR 50*a* after every word is tested. When equality is found, the full stack scan (FSS) flip-flop (not shown) is set. Only then can a scan-in operation asking for the memory link of the most optimum request be honored. If no transfers are requested, the stack scanning process begins again, resetting the FSS flip-flop. If the FSS flip-flop is set, a request for transfer is honored immediately, after which the FSS flip-flop is reset.

A new word may be added to the stack at any time between word tests during a stack scan. When this is done, the FSS flip-flop is reset, and remains so until the top of the stack is reached (the new word is tested). The FSS flip-flop is also reset whenever the most optimum request held in the queuer stack address register 46*a*' in the DGC becomes obsolete. This can occur on subsequent stack scans (without an intervening transfer) if the newly calculated delta of the most optimum request falls below threshold. Moreover when a request from the IOM is honored by transferring the memory link of the most optimum request, the FSS flip-flop is reset, the void is filled and stack word testing resumes starting from the bottom of the stack.

It is believed from the foregoing that the sorting algorithm provided by the disk file optimizer of the present invention, taking into account the constraints of finite test times and system response times, provides the closest possible approach to the shortest-access-time-first policy.

What is claimed is:

1. A queueing device for use with at least a single cyclical storage medium for selecting the optimum request for execution from a queue of such requests based on minimum latency time comprising means for converting each of said requests to information conveying the desired physical shaft position of said cyclical storage medium, means associated with said storage medium for providing information as to the actual shaft position thereof at any given time, means operatively connected to receive concurrently said desired and actual shaft positions and for generating therefrom a delta value indicative of the difference in said positions, said latter means being further adapted to continuously and repetitively generate delta values for all of said requests and for retaining the smallest delta value generated consistent with a predetermined threshold, said smallest delta value representing said optimum request for execution.

2. A queueing device as defined in claim 1 wherein said cyclical storage medium is a magnetic disk, each face of said disk being divided into a predetermined number of annular zones each having a plurality of tracks, each track comprising a plurality of segments which represent the smallest addressable units of data on said face, each of said segments being designated by an address number, a queuer timing track on each disk face having recorded thereon a plurality of sector marks in uniform spaced-apart relation commencing from a disk revolution timing point which serves as a reference.

3. A queueing device as defined in claim 2 wherein said means for providing information as to the actual shaft position of said magnetic disk comprising magnetic sensing means disposed in proximity to said disk face for reading said sector marks, and counter means coupled to said sensing means for accumulating the number of sector marks read by said sensing means during each disk revolution, the accumulated number of sector marks in said counter means representing at any given time the time equivalent of the actual angular disk shaft position with respect to said timing point, circuit means responsive to said sensing means for generating a clear pulse at the end of each disk revolution and for applying said clear pulse to said counter means to effect the resetting thereof.

4. A queueing device as defined in claim 3 wherein said request includes the disk address, the latter being a member of an address continuum ranging in value from zero to a number equal to the number of disk segments minus one.

5. In a data processing system having at least one cyclical storage means, a queueing device comprising a memory for storing access requests to said cyclical storage means, means for converting said access requests into corresponding desired physical shaft positions for said cyclical storage means, each of said storage means having a plurality of sector marks recorded thereon at uniformly spaced predetermined intervals, sensing means for continuously detecting the presence of said sector marks commencing with a reference point on said storage means, counter means coupled to said sensing means for providing a count at any given time of the number of sector marks which have been detected relative to said reference point, actual shaft position register means for storing said count, the accumulated number of sector marks representing the time equivalent of the actual shaft position of said cyclical storage means with respect to said reference point, said sensing means including means for resetting said counter means at the completion of each cycle of said storage means, delta generator and comparator means operatively connected to receive said desired shaft positions corresponding to said access requests and the actual shaft positions from said actual shaft position register means, said delta generator and comparator means comparing said desired position with said actual shaft position and generating a delta value representing the difference between the two positions, register means included within said delta generator and comparator means for storing delta values and the memory address of the corresponding requests, said delta generator and comparator means performing a continuous and repetitive evaluation of the deltas of all of the corresponding access requests stored in said memory, whereby at any given time said last-mentioned register means store the smallest delta value corresponding to the optimum access request from the standpoint of minimum latency, and the corresponding address in memory of said request.

6. A queueing device as defined in claim 5 wherein said cyclical storage means is a magnetic disk, each face of said disk being divided into a predetermined number of annular zones each having a plurality of tracks, each track comprising a plurality of segments, each of said segments being designated by distinct address numbers.

7. A queueing device as defined in claim 6 wherein each of said access requests includes the disk address which is a member of an address continuum ranging in value from zero to a number equal to the total number of disk segments minus one.

8. A queueing device as defined in claim 7 wherein said means for converting said access requests into corresponding physical shaft positions for a magnetic disk comprises arithmetic address converter means for deriving from said disk address the identification of the actual address number of the desired segment as counted from said reference point, said arithmetic address converter means further converting said address number of said desired segment into the corresponding shaft position of said magnetic disk taking into account the physical parameters of the disk and the zone of the address number, said last mentioned shaft position representing an angular address point measured from said disk reference point and being expressed in terms of a number representing the sector marks which would have to pass said sensing means as counted from said reference point, said delta generator and comparator means utilizing said number representing the desired address point on the disk face in combination with the actual disk position number also expressed in terms of accumulated sector marks, for valid latency comparison of different requests stored in said memory.

9. A queueing device as defined in claim 8 wherein said arithmetic address converter means comprises an accumulator, means for reading out the disk address number stored in said memory and for placing the disk address in said accumulator to initiate a multiradix conversion phase, an adder/subtractor operatively connected to said accumulator for performing successive subtractions on said disk address number, said subtraction utilizing as parameters the number of segments present in each disk face, track and zone wherein each of said parameters is successively subtracted from said disk address number to determine the desired disk face, track, zone and segment number, decoding phase and timing controls coupled to said adder/subtractor for providing count pulses indicative of the subtractive steps required for each of said parameters, output counter/register means operatively connected to said phase and timing controls for storing said count pulses which provide information as to the desired disk face, track and zone, said accumulator storing at the termination of said multiradix conversion phase the actual address number of the desired segment as counted from said reference point, said arithmetic address converter further performing a multiplication process in a segment number-to-time conversion phase, control counter means for directing said multiplication process, configuration and parameter section means operatively connected to provide information as to the characteristics of the disk being utilized, means for selecting a suitable multiplication factor based upon said disk characteristics and the zone information derived in said multiradix conversion phase, said multiplication factor being equal to the number of sector marks which can be contained in an arc equivalent to that subscribed by said desired segment, means for multiplying the actual address number of said desired segment with said multiplication factor, the product of said multiplication being a converted segment number representing the number of sector marks from said reference point of the disk to the desired disk access point, and providing a measure of desired absolute shaft position.

10. A queueing device as described in claim 9 wherein said arithmetic address converter also includes a segment register for storing the converted segment number content of said accumulator at the end of said segment number-to-time conversion phase, said converted segment number being expressed in binary coded decimal format, means for causing end-around shifting of the segment number stored in said segment register to execute a binary coded decimal-to-binary conversion phase.

11. A queueing device as defined in claim 7 wherein said delta generator and comparator means comprises an adder/subtractor, means for reading said desired and actual shaft position information into said adder/subtractor, the latter performing a subtraction of the actual shaft position from the desired shaft position, a positive remainder from the subtraction representing a new delta value, a negative remainder being indicative of a condition wherein the delta spans said reference point, said adder/subtractor being responsive to such condition by performing a subtraction of said actual shaft position from the total number of sector marks appearing on said disk face and further performing an addition of the remainder of said last mentioned subtraction to said desired shaft position to produce said new delta value, said delta generator and comparator means further comprising a delta optimizer subtractor for subtracting said new delta value from the previous delta value stored in said delta generator and comparator register means, and logic means operatively connected to the output of said delta optimizer subtractor for testing whether the new delta value exceeds a predetermined threshold and is in fact a valid delta.

12. In an electronic computer having as a subsystem at least a storage unit including a plurality of rotating storage means, electronic unit means connected to said storage unit for effecting the storage and retrieval of information therefrom and control unit means operatively connected to and controlling the operation of said electronic unit means, at least one queueing device comprising a queuer stack for storing control words which represent access requests to read from or write into said rotating storage means, a queuer stack register operatively connected to said queuer stack for receiving control words to be written into or read from said queuer stack, stack control means operatively connected to said queuer stack for providing overall supervision of the writing into and reading from said queuer stack, said stack control means including a top-of-the-stack register and a queuer address register, said top-of-the-stack register providing an indication of the extent to which the queuer stack is occupied by registering the topmost occupied position of the stack, means for decrementing the top-of-the-stack register by one in response to the addition of each control word to the queuer stack, said queuer address register providing a pointer to the queuer stack location of current interest in the queueing process, arithmetic address converter means coupled to said queuer stack register for receiving those portions of said control word which define the desired electronic unit means and the address of the storage means to be accessed, said arithmetic address converter means operating upon said last-mentioned address and converting it into the corresponding desired shaft position of the rotating storage means associated with said desired electronic unit means, means for storing the information representing said desired shaft position in said queuer stack register, actual shaft position counter and register means operatively connected for receiving information representing the actual shaft positions of said storage means, delta generator and comparator means operatively connected to receive said desired shaft position from said queuer stack register and said actual shaft position from said actual shaft position register means, said delta generator and comparator means including delta register means and queuer stack address register means, said delta generator and comparator means being adapted for comparing said desired and actual shaft positions and for generating a delta which represents the difference between the two positions, said delta generator and comparator means further comprising logic means for comparing said last-mentioned delta with the delta stored in said delta register means as a result of the preceding comparison of desired and actual shaft positions, the deltas of all of said control words being continuously and repetitively compared in like manner and the smallest delta consistent with a predetermined threshold value being considered the optimum and being retained in said delta register means, said queuer stack address register means storing the queuer stack address of the control word corresponding to said optimum delta, the optimum delta and its corresponding queuer stack address representing at any given time the access request in the queuer stack which has minimum acceptable latency and is therefore the best possible choice for the contemplated read or write operation.

13. A queueing device as defined in claim 12 wherein said queuer stack for storing control words is a modular memory.

14. A queueing device as defined in claim 12 wherein said plurality of rotating storage means comprise a plurality of magnetic disks, each disk face being divided into a plurality of annular zones each having a plurality of tracks, each track comprising a plurality of segments, each of said segments having an address number commencing with the first track of the first zone of the first disk face and progressing to the first track of the last zone of said first disk face and then proceeding in like manner with the second through the last track of said first disk face and then from said first disk face through all of the disk faces of said magnetic disks to the last disk face in the last storage unit of said subsystem, whereby the highest disk address number refers to the last segment of the last track of the last zone on the last disk face of the last storage unit, a dead-space interposed between the last segment and the first segment in any given track, queuer timing tracks on the respective disk faces of said magnetic disks having recorded thereon in homologous fashion a plurality of sector marks in uniform spaced-apart relation commencing from a common fiducial point on the disk faces.

15. A queueing device as defined in claim 14 further comprising a magnetic read head positioned in proximity to each of said magnetic disks for reading said sector marks, each said storage unit including said actual shaft position counter means for accumulating the number of sector marks read by said read head during a disk revolution, said actual shaft position register means being operatively connected to said counter means for storing said accumulated count, said count representing the time equivalent of the actual angular disk shaft position with respect to said fiducial point, circuit means associated with said read head for generating a clear pulse during said dead-space and for applying said clear pulse to said counter means to effect the resetting thereof.

16. A queueing device as defined in claim 15 wherein each of said control words comprises the disk address which defines the desired electronic unit means and the desired storage unit, disk face, zone, track and segment, and further comprises the function code involved in the definition of the particular operation to be performed, and the memory link which points to an address in the main memory of said electronic computer wherein the disk operation is defined.

17. A queueing device as defined in claim 16 wherein said arithmetic address converter means comprises an accumulator, means for reading out the disk address portion of said control words and for placing said disk address in said accumulator to initiate a multiradix conversion phase, an adder/subtractor operatively connected to said accumulator for performing successive subtractions on said disk address, said adder/subtractor initially subtracting from said disk address a number equaling the segments per storage unit as the largest parameter, the subtraction involving said largest parameter taking place until the remainder is less than said parameter, said adder/subtractor performing similar operations on the successively smaller parameters namely, segments per disk face, track and zone, decoding phase and timing controls coupled to said adder/subtractor for providing count pulses indicative of the subtractive steps required for each of said parameters, output counter/register means operatively connected to said phase and timing controls for storing said count pulses which provide information as to the desired disk face, track and zone, said accumulator storing at the termination of said multiradix conversion phase the actual address number of the desired segment as counted from said fiducial point, said arithmetic address converter further performing a multiplication process in a segment number-to-the-time conversion phase, control counter means for directing said multiplication process, configuration and parameter section means operatively connected to provide information as to the characteristics of the disk being utilized, means for selecting a suitable multiplication factor based upon said disk characteristics and the zone information derived in said multiradix conversion phase, said multiplication factor being equal to the number of sector marks which can be contained in an arc equivalent to that subscribed by said desired segment, means for multiplying the actual address number of said desired segment with said multiplication factor, the product of said multiplication being a converted segment number representing the number of sector marks from said reference point of the disk to the desired disk access point, and providing a measure of desired absolute shaft position.

18. A queueing device as defined in claim 17 wherein said arithmetic address converter further comprises an electronic unit configuration/total timing pulse number selector coupled to said delta generator and comparator means for furnishing thereto information as to the total number of sector marks per circumference for each disk type employed in said subsystem, said latter information being required for delta calculations in cases where the delta bridges the disk dead-space.

19. A queueing device as defined in claim 18 wherein said delta generator and comparator means comprises an adder/subtractor, means for reading said desired and actual shaft position information into said adder/subtractor, the latter performing a subtraction of the actual shaft position from the desired shaft position, a positive remainder from the subtraction representing a new delta value, a negative remainder being indicative of a condition wherein the delta spans said dead-space, said adder/subtractor being responsive to such condition by performing a subtraction of said actual shaft position from the total number of sector marks appearing on said disk face and further performing an addition of the remainder of said last mentioned subtraction to said desired shaft position to produce said new delta value, said delta generator and comparator means further comprising a delta optimizer subtractor for subtracting said new delta value from the previous delta value stored in said delta generator and comparator register means, and logic means operatively connected to the output of said optimizer subtractor for testing whether the new delta value exceeds a predetermined threshold and is in fact a valid delta.

20. A computer system having a queueing device as defined in claim 12, further characterized in that another queueing device similar to the first mentioned device is provided therein, the pair of queueing devices having the capability of interfacing with and sharing respective pluralities of sets of electronic unit means, each of said queueing devices being adapted to have a primary and a secondary disk exchange, said primary exchange including those sets of electronic unit means with which a queueing device communicates in a normal mode of operation, said secondary exchange including those electronic unit means with which said last mentioned queueing device does not normally communicate, first circuit means associated with each of said queueing devices for permitting access thereto to sets of electronic unit means on its primary exchange, second circuit means linking said queueing devices to each other whereby a first of said queueing devices is permitted access to sets of electronic unit means on its secondary exchange by way of said first circuit means associated with the second of said queueing devices, means for providing said last mentioned access in the event of failure of said second of said queueing devices, said first of said devices assuming the accessing of all of said pluralities of sets of electronic unit means normally shared by said queueing devices.

21. A computer system having a pair of queueing devices as defined in claim 20 further characterized in that said first circuit means comprise first and second interface circuit boards associated with each of said queueing devices, means coupling respective sets of electronic unit means to said first and second interface circuit boards of said queueing devices, the sets of electronic unit means associated respectively with said first and second boards of each queueing device being on the primary exchange of the device, a third interface circuit board associated with each of said queueing devices for providing each of said devices with a circuit path for accessing sets of electronic unit means on its secondary exchange respectively by way of said first and second interface circuit boards of the other queueing device.

22. A computer system having a pair of queueing devices as defined in claim 20 further characterized in that predetermined electronic unit designate codes are provided for securing access for each of said queueing devices to one of said sets of electronic unit means on the primary and secondary exchanges of the device, means associated with each of said queueing devices for "locking out" those codes designating the sets of electronic unit means on the secondary exchange of the device during normal operation, and means operative upon failure of a queueing device to provide access to sets of electronic unit means on the secondary exchange of the surviving queueing device by "unlocking" those codes in said last mentioned device which permit said access.

* * * * *